United States Patent
Chen et al.

(10) Patent No.: US 12,250,662 B2
(45) Date of Patent: Mar. 11, 2025

(54) METHOD FOR INFORMATION TRANSMISSION AND RELATED APPARATUSES

(71) Applicant: GUANGDONG OPPO MOBILE TELECOMMUNICATIONS CORP., LTD., Guangdong (CN)

(72) Inventors: Wenhong Chen, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 409 days.

(21) Appl. No.: 17/824,550

(22) Filed: May 25, 2022

(65) Prior Publication Data
US 2022/0287010 A1     Sep. 8, 2022

Related U.S. Application Data

(63) Continuation of application No. PCT/CN2020/074562, filed on Feb. 7, 2020.

(51) Int. Cl.
*H04W 4/00*      (2018.01)
*H04L 1/1812*    (2023.01)
(Continued)

(52) U.S. Cl.
CPC .......... *H04W 72/02* (2013.01); *H04L 1/1812* (2013.01); *H04L 5/0053* (2013.01); *H04W 72/0446* (2013.01); *H04W 72/1273* (2013.01)

(58) Field of Classification Search
CPC ............ H04W 72/02; H04W 72/0446; H04W 72/1273; H04W 72/12; H04L 1/1812; H04L 5/0053; H04L 5/00; H04L 1/18
(Continued)

(56) References Cited

U.S. PATENT DOCUMENTS

| 12,022,486 B2 * | 6/2024 | Li ..................... H04W 72/1273 |
| 2015/0003302 A1 * | 1/2015 | Ekpenyong ........... H04L 1/1861 370/280 |

(Continued)

FOREIGN PATENT DOCUMENTS

| CN | 109600847 | 4/2019 |
| CN | 109964434 | 7/2019 |

(Continued)

OTHER PUBLICATIONS

EPO, Communication for EP Application No. 20917781.5, Apr. 23, 2024.

(Continued)

*Primary Examiner* — Marceau Milord
(74) *Attorney, Agent, or Firm* — Hodgson Russ LLP

(57) ABSTRACT

A method for information transmission and related apparatuses are provided. The method includes the following. A terminal device receives indication information of an acknowledge/non-acknowledge (ACK/NACK) feedback mode configured by a network, and determines a transmission mode of at least one of a first uplink signal, a first physical uplink control channel (PUCCH), and a second PUCCH when the ACK/NACK feedback mode indicated by the indication information is separate feedback and the first PUCCH and the second PUCCH both overlap with a time-domain resource of the first uplink signal, where the first PUCCH and the second PUCCH are associated with different control resource set (CORESET) pool indexes.

14 Claims, 7 Drawing Sheets

---

S301, TRANSMIT FIRST CONFIGURATION INFORMATION, SECOND CONFIGURATION INFORMATION, AND THIRD CONFIGURATION INFORMATION TO A TERMINAL. THE FIRST CONFIGURATION INFORMATION IS USED FOR CONFIGURING A FIRST PUCCH, THE SECOND CONFIGURATION INFORMATION IS USED FOR CONFIGURING A SECOND PUCCH, AND THE THIRD CONFIGURATION INFORMATION IS USED FOR CONFIGURING A FIRST UPLINK SIGNAL. THE FIRST PUCCH AND THE SECOND PUCCH ARE ASSOCIATED WITH DIFFERENT CORESET POOL INDEXES. THE FIRST PUCCH AND THE SECOND PUCCH DO NOT OVERLAP SIMULTANEOUSLY WITH THE FIRST UPLINK SIGNAL IN TIME DOMAIN

(51) Int. Cl.
  *H04L 5/00*     (2006.01)
  *H04W 72/02*    (2009.01)
  *H04W 72/0446*  (2023.01)
  *H04W 72/1273*  (2023.01)
(58) Field of Classification Search
  USPC .......................................................... 370/329
  See application file for complete search history.

(56) References Cited

U.S. PATENT DOCUMENTS

| | | | | |
|---|---|---|---|---|
| 2018/0324688 | A1* | 11/2018 | Li | H04W 72/12 |
| 2018/0368116 | A1* | 12/2018 | Liao | H04W 76/27 |
| 2019/0139446 | A1* | 5/2019 | Cheng | G09B 19/0092 |
| 2019/0223084 | A1* | 7/2019 | John Wilson | H04W 48/10 |
| 2019/0312698 | A1* | 10/2019 | Akkarakaran | H04W 52/42 |
| 2019/0364561 | A1* | 11/2019 | Xiong | H04L 5/0051 |
| 2020/0015250 | A1* | 1/2020 | Yang | H04W 52/06 |
| 2020/0015258 | A1* | 1/2020 | Zhou | H04W 72/23 |
| 2020/0092068 | A1* | 3/2020 | Yang | H04L 1/1858 |
| 2020/0154413 | A1* | 5/2020 | Hosseini | H04W 72/0446 |
| 2020/0221485 | A1* | 7/2020 | Cirik | H04L 25/0224 |
| 2020/0228966 | A1* | 7/2020 | Xu | H04W 72/23 |
| 2020/0229008 | A1* | 7/2020 | Islam | H04W 80/02 |
| 2020/0314811 | A1* | 10/2020 | Lin | H04W 52/0216 |
| 2020/0314900 | A1* | 10/2020 | Hosseini | H04W 74/0858 |
| 2020/0337028 | A1* | 10/2020 | Li | H04L 1/0025 |
| 2020/0367271 | A1* | 11/2020 | Bai | H04W 72/20 |
| 2020/0395744 | A1* | 12/2020 | Chase | H02G 1/14 |
| 2021/0022122 | A1* | 1/2021 | Khoshnevisan | H04W 72/23 |
| 2021/0105100 | A1* | 4/2021 | Zhou | H04L 1/1819 |
| 2021/0367740 | A1* | 11/2021 | Chen | H04L 1/1854 |
| 2022/0231796 | A1* | 7/2022 | Xu | H04L 1/1864 |
| 2024/0155615 | A1* | 5/2024 | Li | H04L 1/1671 |

FOREIGN PATENT DOCUMENTS

| | | |
|---|---|---|
| CN | 110535608 | 12/2019 |
| CN | 110536464 | 12/2019 |
| EP | 3591888 | 1/2020 |
| GB | 2575691 | 1/2020 |
| WO | 2019139446 A1 | 7/2019 |
| WO | 2020010213 | 1/2020 |

OTHER PUBLICATIONS

WIPO, International Search Report and Written Opinion for PCT/CN2020/074562, Nov. 5, 2020.

OPPO, "Enhancements on multi-TRP and multi-panel transmission," 3GPP TSG RAN WG1 Meeting #97, R1-1906287. May 2019.

WIPO, International Search Report and Written Opinion for PCT/CN2020/075152, Nov. 18, 2020.

3rd Generation Partnership Project; Technical Specification Group Radio Access Network; NR; Physical layer procedures for control (Release 16), 3GPP TS 38.213, Dec. 2019, v16.0.0.

OPPO, "Enhancements on multi-TRP and multi-panel transmission," 3GPP TSG RAN WG1 Meeting #99, R1-1911843, Nov. 2019.

Intel Corporation, "On multi-TRP/multi-panel transmission," 3GPP TSG RAN WG1 Meeting #97, R1-1906815, May 2019.

Intel Corporation, "On multi-TRP/multi-panel transmission," 3GPP TSG RAN WG1 Meeting #96bis, R1-1904313, Apr. 2019.

OPPO, "Enhancements on multi-TRP and multi-panel transmission," 3GPP TSG RAN WG1 Meeting #98bis, R1-1910116, Oct. 2019.

Huawei et al., "Summary of Enhancements on Multi-TRP/Panel Transmission," 3GPP TSG RAN WG1 Meeting #98, R1-1909602, Aug. 2019.

IPI, First Examination Report for IN Application No. 202217030172, Sep. 23, 2022.

Huawei et al., UL intra-UE multiplexing between control channels, 3rd Generation Partnership Project (3GPP) Draft, R1-1905456, Apr. 2, 2019, vol. RAN WG1, No. Xi'an, China.

VIVO, Remaining issues on multi-TRP/panel transmission, 3rd Generation Partnership Project (3GPP) Draft, R1-1912039, Nov. 9, 2019, vol. RAN WG1, No. Reno, USA.

EPO, Extended European Search Report and Opinion for EP Application No. 20917781.5, Oct. 17, 2022.

Samsung, "Introduction of MIMO enhancements in NR", 3GPP TSG RAN #86 RP-193127, Internet<URL:https://www.3gpp.org/ftp/tsg_ran/TSG_RAN/TSGR_86/Docs/RP-193127.zip>, Dec. 10, 2019.

OPPO, "Summary#2 on UCI enhancements for URLLC", 3GPP TSG RAN WG1 #99 R1-1913430 , Internet<URL: https://www.3gpp.org/ftp/tsg_ran/WG1_RL1/TSGR1_99/Docs/R1-1913430.zip>, Nov. 24, 2019.

JPO, Notice of Reasons for Refusal issued in JP Application No. 2022-538680, Nov. 24, 2023.

EPO, Examination Report issued in EP Application No. 20917781.5, Dec. 14, 2023.

CNIPA, First Office Action for CN Application No. 202210211646.9, Mar. 31, 2023.

EPO, Communication for EP Application No. 20917781.5, Jul. 10, 2023.

* cited by examiner

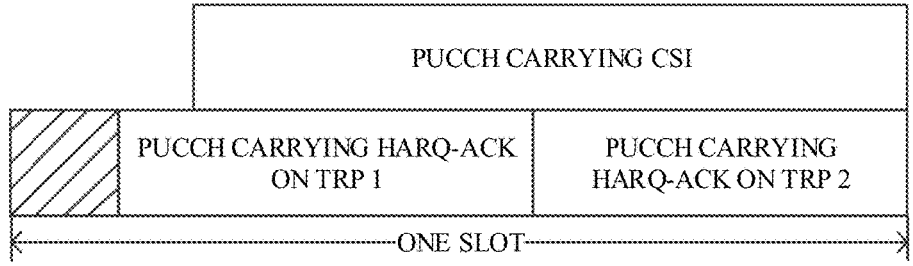
FIG. 1E
S201, DETERMINE A TRANSMISSION MODE OF AT LEAST ONE OF A FIRST UPLINK SIGNAL, A FIRST PUCCH, AND A SECOND PUCCH WHEN THE FIRST PUCCH AND THE SECOND PUCCH BOTH OVERLAP WITH A TIME-DOMAIN RESOURCE OF THE FIRST UPLINK SIGNAL. THE FIRST PUCCH AND THE SECOND PUCCH ARE ASSOCIATED WITH DIFFERENT CORESET POOL INDEXES
FIG. 2A
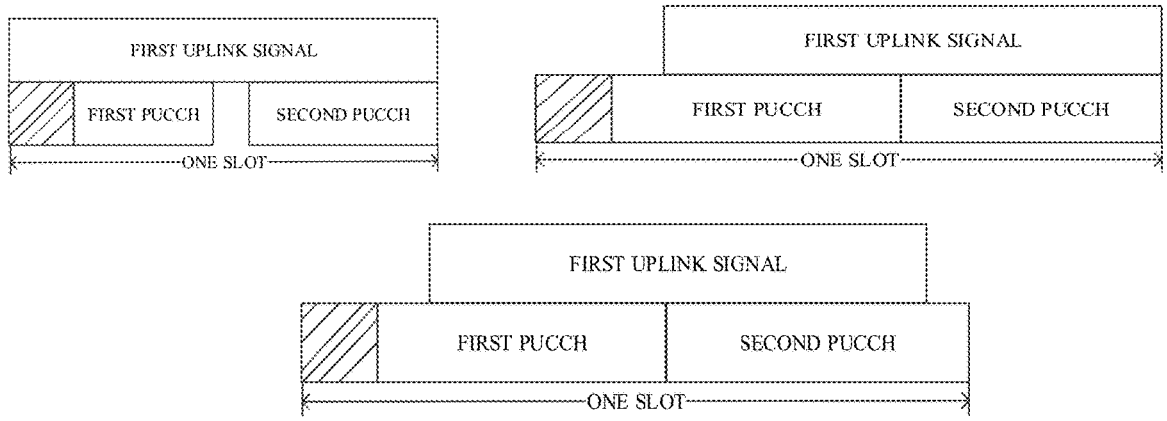
FIG. 2B

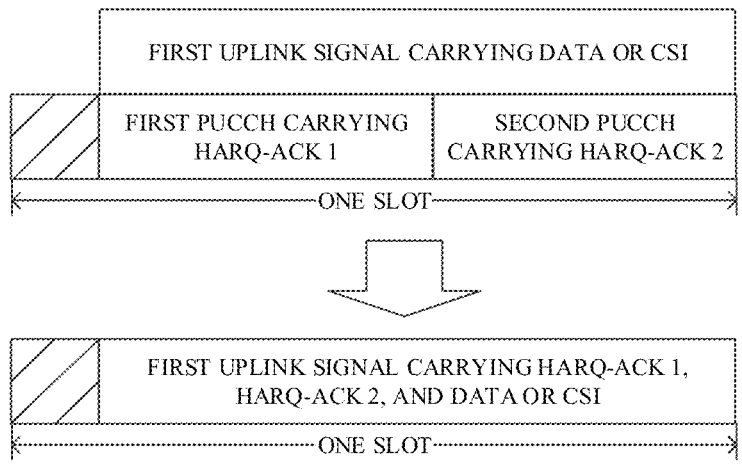
FIG. 2G
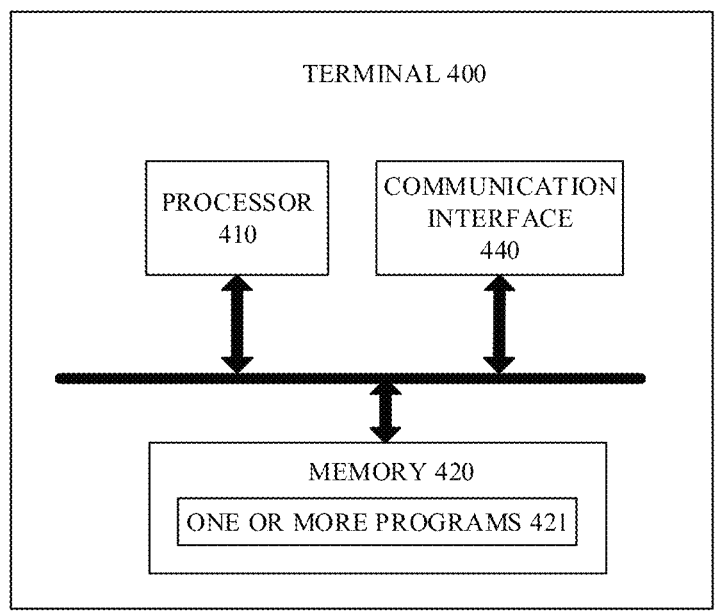
FIG. 3
FIG. 4

METHOD FOR INFORMATION TRANSMISSION AND RELATED APPARATUSES

CROSS-REFERENCE TO RELATED APPLICATION(S)

This application is a continuation of International Application No. PCT/CN2020/074562, filed Feb. 7, 2020, the entire disclosure of which is incorporated herein by reference.

TECHNICAL FIELD

This disclosure relates to the field of communication technology, and particularly to a method for information transmission and related apparatuses.

BACKGROUND

At present, in multi-transmission/reception point (TRP) downlink and uplink non-coherent transmissions, a backhaul connection between TRPs may be ideal or non-ideal. In case of an ideal backhaul, information interchange between TRPs can be carried out quickly and dynamically. In case of a non-ideal backhaul, information interchange between TRPs can only be carried out quasi-statically due to large delay. In a downlink non-coherent transmission, multiple TRPs can adopt different control channels to separately schedule multiple physical downlink shared channel (PDSCH) transmissions of one terminal, or adopt the same control channel to schedule transmissions of different TRPs, where data of different TRPs adopts different transmission layers, and the latter can only be applied to an ideal backhaul.

In case of a non-ideal backhaul, hybrid automatic repeat request acknowledge (HARQ-ACK) feedbacks corresponding to PDSCHs transmitted by different TRPs are required to be transmitted at different times. If HARQ-ACKs corresponding to PDSCHs of different TRPs overlap simultaneously with another uplink signal in time, the terminal is unable to determine how to transmit these uplink signals.

SUMMARY

In a first aspect, implementations of the disclosure provide a method for information transmission. The method is applicable to a terminal device. The method includes the following. Indication information of an acknowledge/non-acknowledge (ACK/NACK) feedback mode configured by a network is received. A transmission mode of at least one of a first uplink signal, a first physical uplink control channel (PUCCH), and a second PUCCH is determined when the ACK/NACK feedback mode indicated by the indication information is separate feedback and the first PUCCH and the second PUCCH both overlap with a time-domain resource of the first uplink signal, where the first PUCCH and the second PUCCH are associated with different control resource set (CORESET) pool indexes.

In a second aspect, implementations of the disclosure provide a method for information transmission. The method is applicable to a network device. The method includes the following. Indication information of an acknowledge/non-acknowledge (ACK/NACK) feedback mode is transmitted to a terminal, the indication information indicates whether the ACK/NACK feedback mode is a separate feedback. First configuration information, second configuration information, and third configuration information are transmitted to a terminal. The first configuration information is used for configuring a first PUCCH, the second configuration information is used for configuring a second PUCCH, and the third configuration information is used for configuring a first uplink signal. The first PUCCH and the second PUCCH are associated with different CORESET pool indexes. The first PUCCH configured by the first configuration information and the second PUCCH configured by the second configuration information does not simultaneously overlap with the first uplink signal configured by the third configuration information in time domain.

In a third aspect, implementations of the disclosure provide a terminal device. The terminal includes transceiver, a processor, and a memory storing instructions. The processor is configured to execute the instructions to make the transceiver receive indication information of an acknowledge/non-acknowledge (ACK/NACK) feedback mode configured by a network, and determine a transmission mode of at least one of a first uplink signal, a first physical uplink control channel (PUCCH), and a second PUCCH when the ACK/NACK feedback mode indicated by the indication information is separate feedback and the first PUCCH and the second PUCCH both overlap with a time-domain resource of the first uplink signal, the first PUCCH and the second PUCCH being associated with different control resource set (CORESET) pool indexes.

BRIEF DESCRIPTION OF THE DRAWINGS

The following will give a brief introduction to the accompanying drawings used for describing implementations or the related art.

FIG. 1E is a schematic diagram illustrating time-domain overlap between multiple hybrid automatic repeat request acknowledges (HARQ-ACK) and channel state information (CSI) provided in implementations of the disclosure.

FIG. 2A is a schematic flowchart of a method for information transmission provided in implementations of the disclosure.

FIG. 2B is a schematic diagram illustrating time-domain overlap of a first physical uplink control channel (PUCCH) and a second PUCCH with a first uplink signal provided in implementations of the disclosure.

FIG. 2G is a schematic diagram illustrating multiplexing of a first PUCCH and a first uplink signal on the first uplink signal provided in implementations of the disclosure.

FIG. 3 is a schematic flowchart of a method for information transmission provided in implementations of the disclosure.

FIG. 4 is a schematic structural diagram of a terminal provided in implementations of the disclosure.

DETAILED DESCRIPTION

The following will describe technical solutions of implementations of the disclosure with reference to the accompanying drawings. Implementations of the disclosure provide a method for information transmission and related apparatuses, to solve a problem that a terminal device is unable to determine how to transmit uplink signals in case hybrid automatic repeat request acknowledges (HARQ-ACK) corresponding to physical downlink shared channels (PDSCH) of different transmission/reception points (TRP) overlap simultaneously with another uplink signal in time, thereby improving information transmission efficiency and saving channel resources.

Figure 1A:
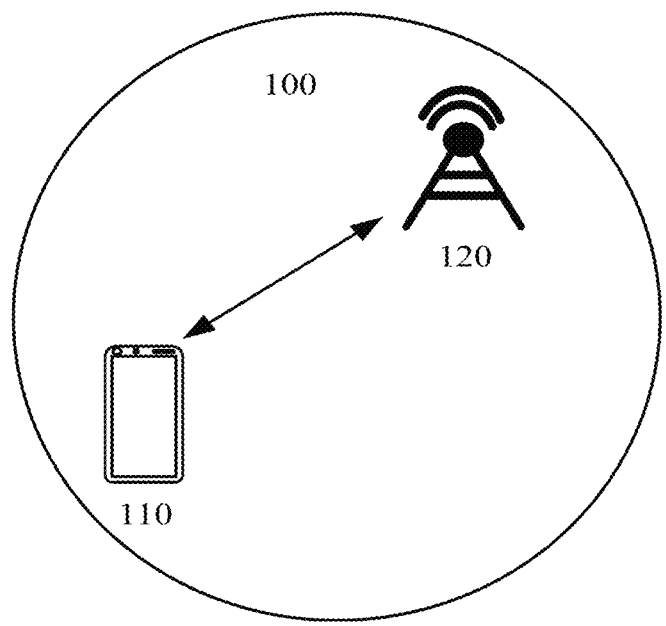
FIG. 1A is an architectural diagram of a system for information transmission provided in implementations of the disclosure.

The technical solutions of implementations of the disclosure are applicable to an exemplary communication system 100 illustrated in FIG. 1A. The exemplary communication system 100 includes a terminal 110 and a network device 120. The terminal 110 is in communication connection with the network device 120.

The exemplary communication system 100 may be, for example, a non-terrestrial network (NTN) system, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (LTE-TDD) system, a universal mobile telecommunication system (UMTS), a worldwide interoperability for microwave access (WiMAX) communication system, a $5^{th}$ generation (5G) system, or a new radio (NR) system, etc.

The terminal 110 in implementations of the disclosure may refer to a user equipment (UE), an access terminal, a subscriber unit, a subscriber station, a mobile station, a remote station, a remote terminal, a mobile device, a user terminal, a terminal, a wireless communication device, a user agent, or a user device. The terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, a relay device, an in-vehicle device, a wearable device, a terminal in a 5G network, a terminal in a future evolved public land mobile network (PLMN), or the like, and implementations of the disclosure are not limited in this regard.

The network device 120 in implementations of the disclosure may be a device that communicates with the terminal. The network device may be a base transceiver station (BTS) in the GSM system or in the CDMA system, or may be a NodeB (NB) in the WCDMA system, or may be an evolved Node B (eNB or eNodeB) in the LTE system, or may be a radio controller in a cloud radio access network (CRAN) scenario. Alternatively, the network device may be a relay device, an access point, an in-vehicle device, a wearable device, a network device in the 5G network, or a network device in a future evolved PLMN, an antenna panel or a group of antenna panels (including multiple antenna panels) of a base station in the 5G system, or may be a network node forming a gNB or a transmission point, such as a baseband unit (BBU), a distributed unit (DU), or the like, and implementations of the disclosure are not limited in this regard.

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing non-real-time protocols and services, and implements functions of a radio resource control (RRC) layer and functions of a packet data convergence protocol (PDCP) layer. The DU is responsible for processing physical (PHY) layer protocols and real-time services, and implements functions of a radio link control (RLC) layer, functions of a media access control (MAC) layer, and functions of a PHY layer. AAU implements some PHY layer processing functions, radio frequency processing functions, and active-antenna related functions. Since RRC layer information will eventually become PHY layer information, or is transformed from PHY layer information, in this architecture, it may be considered that higher layer signaling, such as RRC layer signaling, is transmitted by the DU, or transmitted by the DU and the AAU. It can be understood that, the network device may be a device including one or more of a CU node, a DU node, and an AAU node. In addition, the CU may be categorized as a network device in a radio access network (RAN), or may be categorized as a network device in a core network (CN), and the disclosure is not limited in this regard.

In implementations of the disclosure, the terminal 110 or the network device 120 includes a hardware layer, an operating system layer running above the hardware layer, and an application layer running above the operating system layer. The hardware layer includes hardware such as a central processing unit (CPU), a memory management unit (MMU), and a memory (also referred to as main memory), etc. The operating system may be any one or more computer operating systems that achieve service processing through a process, for example, a Linux operating system, a Unix operating system, an Android operating system, an iOS operating system, or a Windows operating system, etc. The application layer includes applications such as a browser, a contact list, word processing software, instant messaging (IM) software, and the like. In addition, implementations of the disclosure do not constitute limitation on the specific structure of an execution entity of a method provided in implementations of the disclosure, as long as the execution entity can communicate according to the method provided in implementations of the disclosure by running programs that record codes of the method provided in implementations of the disclosure. For example, the execution entity of the method provided in implementations of the disclosure may be the terminal, or may be a functional module in the terminal that can invoke and execute programs.

In NR, the terminal can use an analog beam to transmit uplink data and uplink control information. The terminal can perform uplink beam management based on a sounding reference signal (SRS), to determine an analog beam used for uplink transmission. Specifically, a network may configure SRS resource set 1 for the terminal, where the set contains N SRS resources (N>1). The terminal may use different beams to transmit the N SRS resources. The network device measures a receiving quality of each of the N SRS resources respectively, and selects K SRS resources with the best receiving quality. The network device can further configure SRS resource set 2 which includes K SRS resources, and the terminal will use analog beams used by the K SRS resources selected from set 1 to transmit the SRS resources in set 2. This can be achieved by configuring the K SRS resources selected from set 1 to be reference SRS resources of the K SRS resources in set 2 respectively. In this case, based on SRSs transmitted on SRS resource set 2 by the terminal, the network device can select one SRS resource with the best receiving quality, and notify a corresponding SRS resource indication (SRI) to the terminal. After receiving the SRI, the terminal determines an analog beam used by the SRS resource indicated by the SRI as an analog beam used for physical uplink shared channel (PUSCH) transmission. For a PUSCH, the SRI is indicated by an SRI indication field in downlink control information (DCI) or indicated by an RRC parameter, where a PUSCH configured by RRC is indicated by an RRC parameter.

For a physical uplink control channel (PUCCH), the beam used can be indicated similarly. Specifically, for each PUCCH resource, multiple pieces of spatial relation information (PUCCH-spatialrelationinfo) are configured in RRC signaling, and then a PUCCH-spatialrelationinfo currently used is indicated through MAC layer signaling. Each PUCCH-spatialrelationinfo contains one reference signal used for determining a transmit beam of the PUCCH. For each SRS resource, corresponding SRS-spatialrelationinfo can also be configured through RRC signaling, which contains one reference signal used for determining a transmit beam of the SRS.

In an NR system, multi-transmission/reception point (TRP) downlink and uplink non-coherent transmissions have been introduced. A backhaul connection between TRPs may be ideal or non-ideal. In case of an ideal backhaul, information interchange between TRPs can be carried out quickly and dynamically. In case of a non-ideal backhaul, information interchange between TRPs can only be carried out quasi-statically due to large delay. In a downlink non-coherent transmission, multiple TRPs can adopt different control channels to separately schedule multiple physical downlink shared channel (PDSCH) transmissions of one terminal, or adopt a same control channel to schedule transmissions of different TRPs, where data of different TRPs adopts different transmission layers, and the latter can only be applied to an ideal backhaul.

Figure 1B:
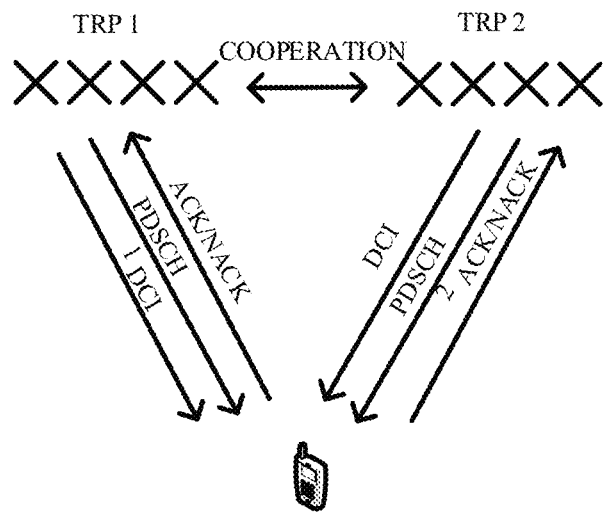
FIG. 1B is a schematic diagram of a multi-physical downlink control channel (PDCCH) downlink non-coherent transmission provided in implementations of the disclosure.
Figure 1C:
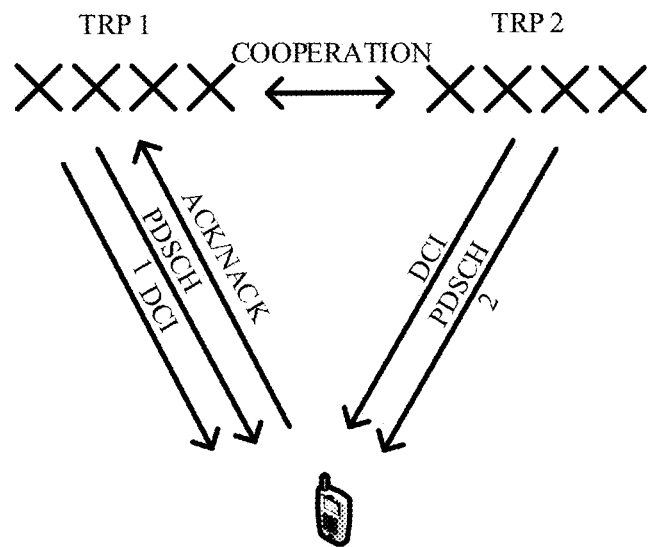
FIG. 1C is a schematic diagram of a multi-PDCCH downlink non-coherent transmission provided in implementations of the disclosure.

For downlink transmission scheduled by multiple physical downlink control channels (PDCCH), a scheduled PDSCH can be transmitted in the same slot or in different slots. The terminal needs to support simultaneous reception of PDCCH and PDSCH from different TRPs. FIG. 1B is a schematic diagram of a multi-PDCCH downlink non-coherent transmission. When the terminal feeds back acknowledge/non-acknowledge (ACK/NACK) and channel state information (CSI), as illustrated in FIG. 1B, the terminal can feed back both the ACK/NACK and the CSI to different TRPs that transmit corresponding PDSCH; alternatively, as illustrated in FIG. 1C, the terminal can combine the ACK/NACK and the CSI and report to one TRP. The former can be applied to both an ideal backhaul scenario and a non-ideal backhaul scenario, and the latter can only be applied to an ideal backhaul scenario. DCI used for PDSCH scheduling transmitted by different TRPs can be carried by different CORESETs, that is, the network device configures multiple CORESETs and each TRP schedules with its own CORESET, that is, different TRPs can be distinguished by CORESET. For example, the network device can configure a CORESET pool index for each CORESET, and different indexes correspond to different TRPs. When feeding back CSI, the terminal needs to feed back CSI corresponding to each TRP. The CSI includes a rank indicator (RI), a precoding-matrix indicator (PMI), a channel-quality indicator (CQI), etc., which can be used by respective TRPs for scheduling of downlink transmission.

Figure 1D:
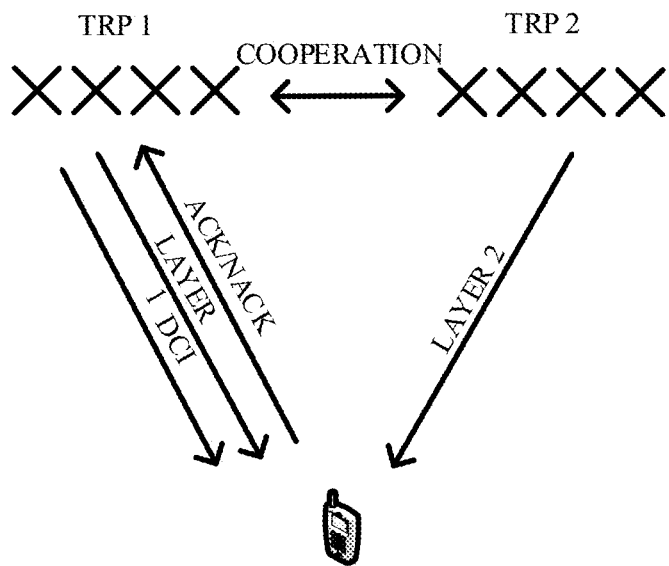
FIG. 1D is a schematic diagram of a single-PDCCH downlink non-coherent transmission provided in implementations of the disclosure.

FIG. 1D is a schematic diagram of a single-PDCCH downlink non-coherent transmission provided in implementations of the disclosure. As illustrated in FIG. 1D, for multi-TRP downlink transmission scheduled by a single PDCCH, a same DCI can schedule multiple transmission layers from different TRPs. Transmission layers from different TRPs adopt demodulation reference symbol (DMRS) ports in different code-division multiplexing (CDM) groups, and adopt different transmission configuration indicator (TCI) states. The network device needs to indicate, in one DCI, DMRS ports from different CDM groups and TCI states corresponding to different CDM groups, thereby supporting transmission at different DMRS ports with different beams. In this case, hybrid automatic repeat request (HARQ)-ACK feedback and CSI reporting can reuse a mechanism in an existing protocol. This solution can only be applied to an ideal backhaul scenario.

In case of a non-ideal backhaul, HARQ-ACK feedbacks corresponding to PDSCHs transmitted by different TRPs need to be transmitted at different times, and cannot be multiplexed. For example, HARQ-ACKs of different TRPs may be transmitted on two PUCCH resources occupying different orthogonal frequency division multiplexing (OFDM) symbols in one slot. However, as illustrated in FIG. 1E, if two HARQ-ACKs overlap simultaneously with another uplink signal in time, since the terminal has no idea which TRP the uplink signal is transmitted to, the terminal is unable to determine which HARQ-ACK should be multiplexed with the uplink signal or whether the uplink signal should be transmitted.

With respect to the above problems, implementations of the disclosure provide a method for information transmission, which will be elaborated below with reference to the accompanying drawings.

Refer to FIG. 2A, which is a schematic flowchart of a method for information transmission provided in implementations of the disclosure. As illustrated in FIG. 2A, the method includes the following.

S201, if a first PUCCH and a second PUCCH both overlap with a time-domain resource of a first uplink signal, a terminal determines a transmission mode of at least one of the first uplink signal, the first PUCCH, and the second PUCCH. The first PUCCH and the second PUCCH are associated with different CORESET pool indexes.

"The first PUCCH and the second PUCCH both overlap with the first uplink signal in time domain" means that the first PUCCH at least partially overlaps with the first uplink signal in time domain and the second PUCCH also at least partially overlaps with the first uplink signal in time domain, as illustrated in FIG. 2B. FIG. 2B is a schematic diagram illustrating time-domain overlap of the first PUCCH and the second PUCCH with the first uplink signal provided in implementations of the disclosure.

It is to be further explained that, the first PUCCH in this embodiment refers to one of two PUCCHs that overlap with the first uplink signal in time domain in a general sense rather than refer to a particular PUCCH. The second PUCCH in this embodiment refers to one of two PUCCHs that overlap with the first uplink signal in time domain in a general sense. There is no restriction on the order of time of the first PUCCH and the second PUCCH. Therefore, the first PUCCH and the second PUCCH are interchangeable in the following descriptions.

The first PUCCH may be a PUCCH carrying HARQ-ACK, or may be a PUCCH carrying CSI, or may be a PUCCH carrying a schedule request (SR). The second PUCCH may be a PUCCH carrying HARQ-ACK, or may be a PUCCH carrying CSI, or may be a PUCCH carrying an SR.

In one implementation, the method can be applied to a case where an ACK/NACK feedback mode configured by a network is separate feedback. In other words, the method may be described as follows. When the ACK/NACK feedback mode configured by the network is separate feedback and the first PUCCH and the second PUCCH both overlap with the first uplink signal in time domain, the transmission mode of at least one of the first uplink signal, the first PUCCH, and the second PUCCH is determined. A target PUCCH is the first PUCCH and/or the second PUCCH. The first PUCCH and the second PUCCH do not overlap in time domain and are associated with different CORESET pool indexes.

As can be seen, in this embodiment of the disclosure, a terminal device determines the transmission mode of at least one of the first uplink signal, the first PUCCH, and the second PUCCH, which can solve the problem that the terminal device is unable to determine how to transmit uplink signals in case HARQ-ACKs corresponding to PDSCHs of different TRPs overlap simultaneously with another uplink signal in time, thereby improving information transmission efficiency and saving channel resources.

In a possible example, if the first PUCCH and the second PUCCH both overlap with the time-domain resource of the first uplink signal, the transmission mode of at least one of the first uplink signal, the first PUCCH, and the second PUCCH is determined as follows. The transmission mode of at least one of the first uplink signal, the first PUCCH, and the second PUCCH is determined according to first information. The first information includes at least one of: a CORESET pool index associated with the first uplink signal, spatial relation information of the first uplink signal, a signal type of the first uplink signal, a TCI state of the first uplink signal, a type of information carried by the first uplink signal, or an ACK/NACK feedback mode configured by a network.

In an implementation, the transmission mode of at least one of the first uplink signal, the first PUCCH, and the second PUCCH may be determined according to the first information as follows. The transmission mode of at least one of the first uplink signal, the first PUCCH, and the second PUCCH may be determined according to the CORESET pool index associated with the first uplink signal. The transmission mode of at least one of the first uplink signal, the first PUCCH, and the second PUCCH may be determined according to the spatial relation information of the first uplink signal. The transmission mode of at least one of the first uplink signal, the first PUCCH, and the second PUCCH may be determined according to the signal type of the first uplink signal. The transmission mode of at least one of the first uplink signal, the first PUCCH, and the second PUCCH may be determined according to the TCI state of the first uplink signal. The transmission mode of at least one of the first uplink signal, the first PUCCH, and the second PUCCH may be determined according to the type of information carried by the first uplink signal. The transmission mode of at least one of the first uplink signal, the first PUCCH, and the second PUCCH may be determined according to the ACK/NACK feedback mode configured by the network. Alternatively, the above schemes of determining the transmission mode of at least one of the first uplink signal, the first PUCCH, and the second PUCCH may be arbitrarily combined, which will not be elaborated herein.

As can be seen, in this embodiment of the disclosure, the terminal device determines the transmission mode of at least one of the first uplink signal, the first PUCCH, and the second PUCCH according to the first information, which can solve the problem that the terminal device is unable to determine how to transmit uplink signals in case HARQ-ACKs corresponding to PDSCHs of different TRPs overlap simultaneously with another uplink signal in time, thereby improving transmission efficiency of uplink control information and saving channel resources.

In a possible example, the first information includes the CORESET pool index associated with the first uplink signal. The transmission mode of at least one of the first uplink signal, the first PUCCH, and the second PUCCH is determined according to the first information as follows. Determine to multiplex and transmit the first uplink signal and the first PUCCH when the CORESET pool index associated with the first uplink signal is the same as that associated with the first PUCCH, and/or determine not to transmit the second PUCCH or to transmit the first PUCCH and the second PUCCH on different time-domain resources when the CORESET pool index associated with the first uplink signal is different from that associated with the second PUCCH.

Information in the first uplink signal and information in the first PUCCH are multiplexed and then transmitted on the first PUCCH, and the second PUCCH is transmitted on a different time-domain resource. An application scenario of this manner includes, but is not limited to, less information being carried by the first uplink signal. In this case, information in the first uplink signal and information in the first PUCCH can be carried by the first PUCCH.

In one implementation, the terminal device multiplexes and transmits the first uplink signal and one of the first PUCCH and the second PUCCH which is associated with the same CORESET pool index as the first uplink signal, and here, suppose that the first PUCCH is associated with the same CORESET pool index as first uplink signal. For example, the CORESET pool index (CORESETPoolIndex) associated with the first uplink signal is 0, the CORESET pool index (CORESETPoolIndex) associated with the first PUCCH is also 0, and the CORESET pool index (CORESETPoolIndex) associated with the second PUCCH is 1. In this case, the terminal device multiplexes and transmits the first uplink signal and the first PUCCH. In addition, if the CORESET pool index associated with the second PUCCH is different from that associated with the first uplink signal, the terminal device may not transmit the second PUCCH or may transmit the first PUCCH and the second PUCCH on different time-domain resources.

It is to be further noted that, the first PUCCH in this embodiment refers to one of two PUCCHs that overlap with the first uplink signal in time domain in a general sense rather than refer to a particular PUCCH. The second PUCCH in this embodiment refers to one of two PUCCHs that overlap with the first uplink signal in time domain in a general sense. There is no restriction on the order of time of the first PUCCH and the second PUCCH. Therefore, the first PUCCH and the second PUCCH are interchangeable in the following descriptions. Therefore, the PUCCH that is associated with the same CORESET pool index as the first uplink signal may also be the second PUCCH. In this case, the terminal multiplexes and transmits the first uplink signal and the second PUCCH.

As can be seen, in this embodiment of the disclosure, the terminal multiplexes and transmits uplink signals directed to the same TRP (that is, associated with the same CORESET pool index) and gives priority to transmission of the multiplexed information, which is possible to avoid information discarding as much as possible, save channel resources, and improve information transmission efficiency.

In a possible example, the first information includes the spatial relation information of the first uplink signal. The transmission mode of at least one of the first uplink signal, the first PUCCH, and the second PUCCH is determined according to the first information as follows. Determine to multiplex and transmit the first uplink signal and the first PUCCH when a reference source signal indicated by the spatial relation information of the first uplink signal is the same as that indicated by spatial relation information of the first PUCCH, and/or determine not to transmit the second PUCCH or to transmit the first PUCCH and the second PUCCH on different time-domain resources when the reference source signal indicated by the spatial relation information of the first uplink signal is different from that indicated by spatial relation information of the second PUCCH.

A reference source signal indicated by spatial relation information is used for determining a transmit beam of a corresponding uplink signal. The terminal can determine the transmit beam of the corresponding uplink signal according to a beam for transmitting or receiving the reference source signal.

For example, the reference source signal indicated by the spatial relation information of the first uplink signal is SRS resource 0, the reference source signal indicated by the spatial relation information of the first PUCCH is also SRS resource 0, and the reference source signal indicated by the spatial relation information of the second PUCCH is SRS resource 1.

"Determine to multiplex and transmit the first uplink signal and the first PUCCH" includes multiplexing information in the first uplink signal and information in the first PUCCH and transmitting on the first PUCCH, and transmitting the second PUCCH on a different time-domain resource. An application scenario of this manner includes, but is not limited to, less information being carried by the first uplink signal. In this case, information in the first uplink signal and information in the first PUCCH can be carried by the first PUCCH.

Specifically, for the manner in which the first uplink signal and the first PUCCH are multiplexed and transmitted, reference can be made to descriptions in the foregoing examples, which will not be elaborated again herein. Specifically, for the manner in which the terminal device does not transmit the second PUCCH or transmits the first PUCCH and the second PUCCH on different time-domain resources, reference can be made to descriptions in the foregoing examples, which will not be elaborated again herein.

It is to be further noted that, the PUCCH of which the spatial relation information indicates the same reference source signal as the spatial relation information of the first uplink signal may also be the second PUCCH. In this case, the terminal multiplexes and transmits the first uplink signal and the second PUCCH.

As can be seen, in this embodiment of the disclosure, the terminal multiplexes and transmits uplink signals directed to the same TRP according to the spatial relation information of the first uplink signal, and gives priority to transmission of the multiplexed information, which is possible to avoid discard of information as much as possible, improve information transmission efficiency, and save channel resources.

In a possible example, the first information includes the signal type of the first uplink signal. Determining the transmission mode of at least one of the first uplink signal, the first PUCCH, and the second PUCCH according to the first information includes at least one of the following. When the first uplink signal is a PUSCH, information carried by the first PUCCH and data carried by the PUSCH are transmitted on the PUSCH and determine not to transmit the second PUCCH. When the first uplink signal is a PUSCH, the first PUCCH and the second PUCCH are transmitted to a network device on different time-domain resources without transmitting the first uplink signal. When the first uplink signal is a PUSCH scheduled by RRC, the first PUCCH and the second PUCCH are transmitted to the network device without transmitting the first uplink signal. When the first uplink signal is a third PUCCH, information carried by the first PUCCH and information carried by the third PUCCH are transmitted on the first PUCCH, the third PUCCH, or a fourth PUCCH.

In one implementation, the transmission mode of at least one of the first uplink signal, the first PUCCH, and the second PUCCH may be determined as follows. When the first uplink signal is a PUSCH, information carried by the first PUCCH and data in the PUSCH are multiplexed and then transmitted on the PUSCH, and determine not to transmit the second PUCCH.

The PUSCH may be a PUSCH scheduled by DCI, or may be a PUSCH scheduled by RRC.

Figure 2C:
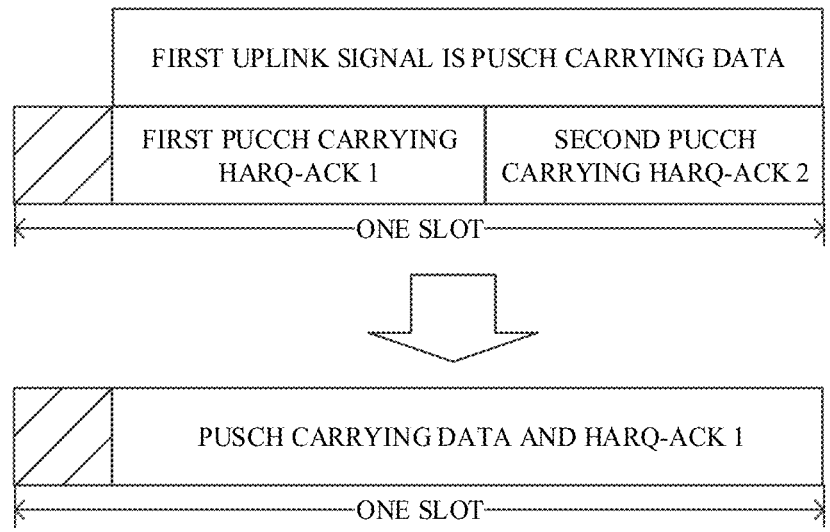
FIG. 2C is a schematic diagram illustrating multiplexing of a first PUCCH and a first uplink signal on the first uplink signal.

For example, FIG. 2C is a schematic diagram illustrating multiplexing of the first PUCCH and the first uplink signal on the first uplink signal. As illustrated in FIG. 2C, the first PUCCH caries HARQ-ACK 1, and the second PUCCH carries HARQ-ACK 2. The terminal can multiplex HARQ-ACK 1 in the first PUCCH and data in the PUSCH and then transmit on the PUSCH. In this case, since the second PUCCH overlaps with the PUSCH, the terminal drops transmission of the second PUCCH this time.

In one implementation, the transmission mode of at least one of the first uplink signal, the first PUCCH, and the second PUCCH may be determined as follows. When the first uplink signal is the PUSCH scheduled by RRC, the first PUCCH and the second PUCCH are transmitted to the network device and the first uplink signal is not transmitted.

Figure 2D:
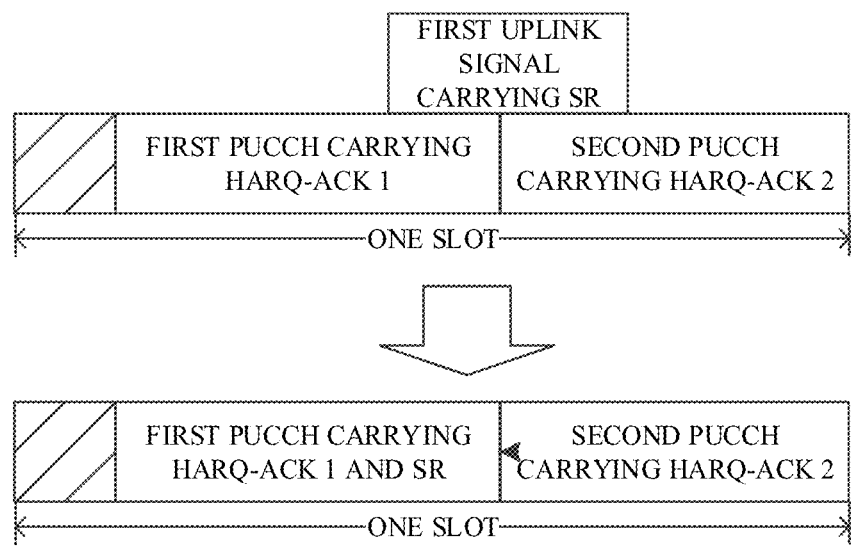
FIG. 2D is a schematic diagram illustrating multiplexing of a first PUCCH and a first uplink signal on the first PUCCH provided in implementations of the disclosure.
Figure 2E:
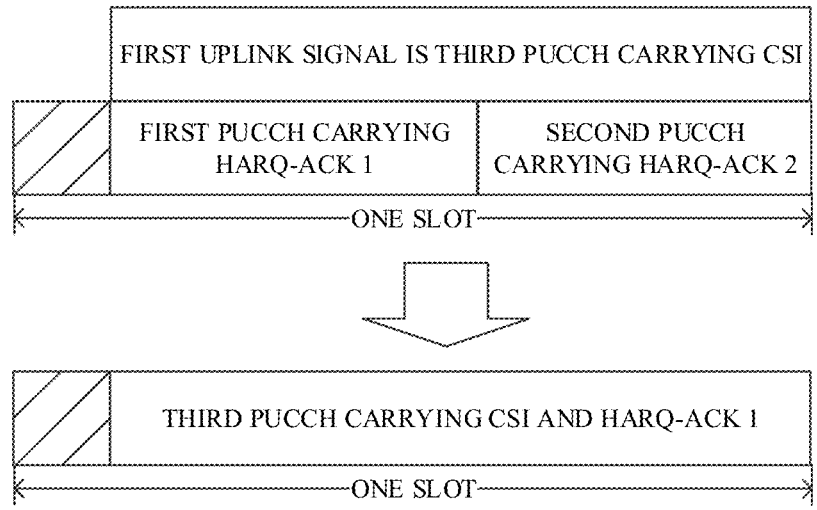
FIG. 2E is a schematic diagram illustrating multiplexing of a first PUCCH and a first uplink signal on the first uplink signal provided in implementations of the disclosure.
Figure 2F:
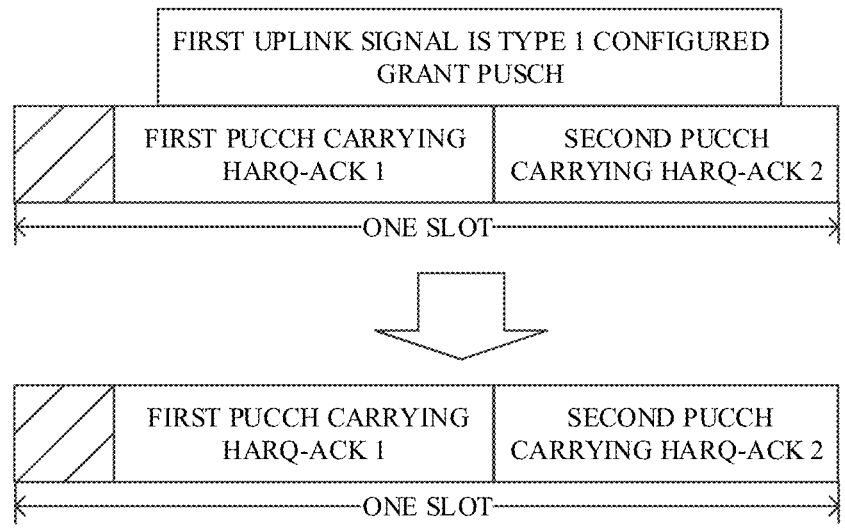
FIG. 2F is a schematic diagram illustrating no first uplink signal transmission by a terminal device provided in implementations of the disclosure.

It is to be further explained that, as illustrated in FIG. 2F, the PUSCH scheduled by RRC is a type 1 configured grant PUSCH. A transmission parameter of the PUSCH is configured by RRC, and a transmission resource periodically occurs, where the period is configured by RRC.

In one implementation, the transmission mode of at least one of the first uplink signal, the first PUCCH, and the second PUCCH may be determined as follows. When the first uplink signal is a third PUCCH, information carried by the first PUCCH and information carried by the third PUCCH are multiplexed and then transmitted on any one of the first PUCCH, the third PUCCH, and a fourth PUCCH.

The third PUCCH may be a PUCCH carrying CSI, or may be a PUCCH carrying an SR.

After multiplexing information carried by the first PUCCH and information carried by the third PUCCH, the terminal may transmit on the first PUCCH, may transmit on the third PUCCH, or may transmit on the fourth PUCCH.

In this example, the fourth PUCCH may be a PUCCH resource that is dedicated for multiplexing and transmitting multiple pieces of uplink control information and configured by a network. For example, FIG. 2D is a schematic diagram illustrating multiplexing of the first PUCCH and the third PUCCH on the first PUCCH provided in implementations of the disclosure. As illustrated in FIG. 2D, the first PUCCH carries HARQ-ACK 1, and the third PUCCH carries an SR. In this case, HARQ-ACK 1 and the SR can be multiplexed and then transmitted on the first PUCCH. In this situation, the terminal can still transmit the second PUCCH on another time-domain resource.

For another example, as illustrated in FIG. 2E, the first PUCCH carries HARQ-ACK, and the third PUCCH carries CSI. In this case, the HARQ-ACK and the CSI can be multiplexed and then transmitted on the third PUCCH. In this situation, since the second PUCCH overlaps with the third PUCCH in time domain, the terminal drops transmission of the second PUCCH this time.

In one implementation, the transmission mode of at least one of the first uplink signal, the first PUCCH, and the second PUCCH may also be determined through a combination of the above transmission modes, which will not be described in detail herein.

As can be seen, in this embodiment of the disclosure, by determining the transmission mode of at least one of the first uplink signal, the first PUCCH, and the second PUCCH, the terminal can give priority to transmission of a signal type corresponding to uplink information of higher importance in case the first uplink signal overlaps with two PUCCHs at the same time, which is possible to reduce influence on downlink transmission performance to the least, improve information transmission efficiency, and save channel resources.

In a possible example, the first information includes the TCI state of the first uplink signal. The transmission mode of at least one of the first uplink signal, the first PUCCH, and the second PUCCH is determined according to the first information as follows. Multiplex and transmit the first uplink signal and the first PUCCH when a reference source signal indicated by the TCI state of the first uplink signal is the same as that indicated by a TCI state or spatial relation information of the first PUCCH, and/or not transmit the second PUCCH or transmit the first PUCCH and the second PUCCH on different time-domain resources when the reference source signal indicated by the TCI state of the first uplink signal is different from that indicated by the TCI state or the spatial relation information of the first PUCCH.

The reference source signal indicated by the TCI state may be used for determining a transmit beam of a corresponding uplink signal, or may be used for determining other information of the corresponding uplink signal such as timing information. Taking the transmit beam as an example, the terminal can determine the transmit beam of the corresponding uplink signal according to a beam for transmitting or receiving the reference source signal.

For example, the first uplink signal is a PUSCH, the reference source signal indicated by the TCI state of the first uplink signal is CSI-RS resource 0, the reference source signal indicated by the spatial relation information of the first PUCCH is also CSI-RS resource 0, and a reference source signal indicated by spatial relation information of the second PUCCH is SRS resource 0. In this case, the PUSCH and the first PUCCH are multiplexed and transmitted.

For another example, the first uplink signal is a third PUCCH, the reference source signal indicated by the TCI state of the first uplink signal is CSI-RS resource 0, the reference source signal indicated by the TCI state of the first PUCCH is also CSI-RS resource 0, and a reference source signal indicated by a TCI state of the second PUCCH is SRS resource 0. In this case, the third PUCCH and the first PUCCH are multiplexed and transmitted.

Specifically, for the manner in which the first uplink signal and the first PUCCH are multiplexed and transmitted, reference can be made to descriptions in the foregoing examples, which will not be elaborated again herein. Specifically, for the manner in which the terminal device does not transmit the second PUCCH or transmits the first PUCCH and the second PUCCH on different time-domain resources, reference can be made to descriptions in the foregoing examples, which will not be elaborated again herein.

As can be seen, in this embodiment of the disclosure, the terminal multiplexes and transmits uplink signals directed to the same TRP according to the TCI state of the first uplink signal, and gives priority to transmission of the multiplexed information, which is possible to avoid as much as possible discard of information, improve information transmission efficiency, and save channel resources.

In a possible example, the first information includes the type of information carried by the first uplink signal. Determining the transmission mode of at least one of the first uplink signal, the first PUCCH, and the second PUCCH according to the first information includes at least one of the following. When the first uplink signal carries data and the first PUCCH and the second PUCCH carry CSI, determine to transmit information carried by the first PUCCH and data carried by the first uplink signal on the first uplink signal and determine not to transmit the second PUCCH. When the first uplink signal carries data and the first PUCCH and the second PUCCH carry HARQ-ACK, determine to transmit to a network device the first PUCCH and the second PUCCH on different time-domain resources and not to transmit the first uplink signal. When the first uplink signal carries CSI and the first PUCCH and the second PUCCH carry CSI, determine to transmit information carried by the first PUCCH and information carried by the first uplink signal on the first uplink signal and determine not to transmit the second PUCCH, or determine to transmit information carried by the first PUCCH and information carried by the first uplink signal on the first PUCCH and transmit the second PUCCH on a different time-domain resource. When the first uplink signal carries CSI and the first PUCCH and the second PUCCH carry HARQ, determine to transmit to the network device the first PUCCH and the second PUCCH on different time-domain resources and determine not to transmit the first uplink signal. When the first uplink signal carries an SR and the first PUCCH and the second PUCCH carry CSI, determine to transmit information carried by the first PUCCH and information carried by the first uplink signal on the first PUCCH and determine to transmit the second PUCCH on a different time-domain resource. When the first uplink signal carries an SR and the first PUCCH and the second PUCCH carry HARQ, determine to transmit information carried by the first PUCCH and information carried by the first uplink signal on the first PUCCH and determine to transmit the second PUCCH on a different time-domain resource.

In an implementation, the transmission mode of at least one of the first uplink signal, the first PUCCH, and the second PUCCH may be determined according to the first information as follows. When the first uplink signal carries data and the first PUCCH and the second PUCCH carry CSI, determine to transmit information carried by the first PUCCH and data carried by the first uplink signal on the first uplink signal and determine not to transmit the second PUCCH. When the first uplink signal carries data and the first PUCCH and the second PUCCH carry HARQ-ACK, determine to transmit to a network device the first PUCCH and the second PUCCH on different time-domain resources and not to transmit the first uplink signal. When the first uplink signal carries CSI and the first PUCCH and the second PUCCH carry CSI, determine to transmit information carried by the first PUCCH and information carried by the first uplink signal on the first uplink signal and determine not to transmit the second PUCCH, or determine to transmit information carried by the first PUCCH and information carried by the first uplink signal on the first PUCCH and transmit the second PUCCH on a different time-domain resource. When the first uplink signal carries CSI and the first PUCCH and the second PUCCH carry HARQ, determine to transmit to the network device the first PUCCH and the second PUCCH on different time-domain resources and determine not to transmit the first uplink signal. When the first uplink signal carries an SR and the first PUCCH and the second PUCCH carry CSI, determine to transmit information carried by the first PUCCH and information carried by the first uplink signal on the first PUCCH and determine to transmit the second PUCCH on a different time-domain resource. When the first uplink signal carries an SR and the first PUCCH and the second PUCCH carry HARQ, determine to transmit information carried by the first PUCCH and information carried by the first uplink signal on the first PUCCH and determine to transmit the second PUCCH on a different time-domain resource. Alternatively, the above transmission modes may be arbitrarily combined, which will not be described in detail herein.

As can be seen, in this embodiment of the disclosure, by determining the transmission mode of at least one of the first uplink signal, the first PUCCH, and the second PUCCH according to the type of information carried by the first uplink signal, the terminal device can multiplex and transmit uplink signals directed to the same TRP and give priority to transmission of the multiplexed information, and can transmit information on different time-domain resources, which is possible to avoid information discarding as much as possible.

In a possible example, if the first uplink signal is a third PUCCH, multiplexing and transmission of the first uplink signal and the first PUCCH means that information carried by the first PUCCH and information carried by the third PUCCH are multiplexed, and the multiplexed information is transmitted on the first PUCCH, the third PUCCH, or the fourth PUCCH.

The terminal may multiplex information carried by the first PUCCH and information carried by the third PUCCH as follows. Information carried by the first PUCCH and information carried by the third PUCCH are cascaded for channel encoding.

For example, as illustrated in FIG. 2D, the first PUCCH carries HARQ-ACK 1, and the third PUCCH carries an SR. In this case, HARQ-ACK 1 and the SR can be multiplexed and then transmitted on the first PUCCH. In this situation, the terminal can still transmit the second PUCCH on another time-domain resource, that is, transmit the first PUCCH and the second PUCCH on different time-domain resources.

For another example, as illustrated in FIG. 2E, the first PUCCH carries HARQ-ACK, and the third PUCCH carries CSI. In this case, the HARQ-ACK and the CSI may be multiplexed and then transmitted on the third PUCCH. In this situation, since the second PUCCH overlaps with the third PUCCH in time domain, the terminal drops transmission of the second PUCCH this time.

In one implementation, the terminal may also transmit multiplexed uplink information on the fourth PUCCH, where the fourth PUCCH may be a PUCCH resource that is dedicated for multiplexing and transmitting multiple pieces of uplink control information and configured by a network device.

As can be seen, in this embodiment of the disclosure, the terminal multiplexes information carried by the first PUCCH and information carried by the third PUCCH and transmits the multiplexed information on the first PUCCH, the third PUCCH, or the fourth PUCCH, which can avoid discard of information, improve information transmission efficiency, and save channel resources.

In a possible example, if the first uplink signal is a PUSCH, multiplexing and transmission of the first uplink signal and the first PUCCH means that information carried by the first PUCCH and data carried by the PUSCH are multiplexed, and then the multiplexed data is transmitted on the PUSCH. In this situation, the terminal does not transmit the second PUCCH.

The PUSCH may be a PUSCH scheduled by DCI, or may be a PUSCH scheduled by RRC.

The PUSCH scheduled by RRC is a type 1 configured grant PUSCH. A transmission parameter of the PUSCH is configured by RRC, and a transmission resource periodically occurs, where the period is configured by RRC.

For example, as illustrated in FIG. 2C, the first PUCCH carries HARQ-ACK 1, and the second PUCCH carries HARQ-ACK 2. The terminal can multiplex HARQ-ACK 1 in the first PUCCH and data in the PUSCH and then transmit on the PUSCH. In this situation, since the second PUCCH overlaps with the PUSCH, the terminal drops transmission of the second PUCCH this time.

As can be seen, in this embodiment of the disclosure, the terminal multiplexes information carried by the first PUCCH and data carried by the PUSCH and then transmits the multiplexed data on the PUSCH, which is possible to avoid information discarding as much as possible, improve information transmission efficiency, and save channel resources.

In a possible example, multiplexing and transmission of the first uplink signal and the first PUCCH specifically means that information in the first uplink signal and information in the first PUCCH are multiplexed and then transmitted on the first PUCCH, and the second PUCCH is transmitted on a different time-domain resource.

An application scenario of the method in this example includes, but is not limited to, less information being carried by the first uplink signal. In this case, information in the first uplink signal and information in the first PUCCH can be carried by the first PUCCH.

In a possible example, transmission of the first PUCCH and the second PUCCH on different time-domain resources specifically means that the first PUCCH and the second PUCCH are transmitted on different time-domain resources and the first uplink signal is not transmitted.

An application scenario of the method in this example includes, but is not limited to, more information being carried by the first uplink signal or a scenario in which information carried by the second PUCCH has a priority higher than that carried by the first uplink signal. For example, the second PUCCH carries HARQ-ACK, or an SR, or CSI that is of high importance.

In a possible example, the first information includes the ACK/NACK feedback mode configured by the network. The transmission mode of at least one of the first uplink signal, the first PUCCH, and the second PUCCH is determined according to the first information as follows. When the ACK/NACK feedback mode is joint feedback, determine to multiplex information carried by the first PUCCH, information carried by the second PUCCH, and information carried by the first uplink signal and transmit on a same PUCCH or PUSCH. And/or, when the ACK/NACK feedback mode is separate feedback, determining the transmission mode of at least one of the first uplink signal, the first PUCCH, and the second PUCCH includes at least one of the following. Determine not to transmit the first uplink signal, the first PUCCH, and the second PUCCH. Determine to multiplex information carried by the first uplink signal and information carried by the first PUCCH and transmit on the first uplink signal, and determine not to transmit the second PUCCH. Determine to transmit the first PUCCH and the second PUCCH, and determine not to transmit the first uplink signal. Multiplex information carried by the first uplink signal and information carried by the first PUCCH and determine to transmit on the first PUCCH, and determine to transmit the second PUCCH on a different time-domain resource.

The ACK/NACK feedback mode may be configured through RRC signaling.

In one implementation, the transmission mode of at least one of the first uplink signal, the first PUCCH, and the second PUCCH may be determined as follows. As illustrated in FIG. 2G, when the ACK/NACK feedback mode is joint feedback, information carried by the first PUCCH, information carried by the second PUCCH, and information carried by the first uplink signal are multiplexed and transmitted on a same PUCCH or PUSCH.

The same PUCCH may be the first PUCCH, may be the second PUCCH, may be the first uplink signal, or may be a configured PUCCH other than the first PUCCH and the second PUCCH. The PUSCH may be the first uplink signal, or may be an additionally configured PUSCH.

In one implementation, the transmission mode may be the following. If the ACK/NACK feedback mode is separate feedback, the manner of multiplexing the first uplink signal and the target PUCCH includes not transmitting the first uplink signal, the first PUCCH, and the second PUCCH.

In one implementation, the transmission mode may be the following. If the ACK/NACK feedback mode is separate feedback, the manner of multiplexing the first uplink signal and the target PUCCH includes multiplexing information carried by the first uplink signal and information carried by the first PUCCH and transmitting on the first uplink signal without transmitting the second PUCCH.

In one implementation, the transmission mode may be the following. If the ACK/NACK feedback mode is separate feedback, the manner of multiplexing the first uplink signal and the target PUCCH includes transmitting the first PUCCH and the second PUCCH and not transmitting the first uplink signal.

In one implementation, the transmission mode may be the following. If the ACK/NACK feedback mode is separate feedback, the manner of multiplexing the first uplink signal and the target PUCCH includes multiplexing information carried by the first uplink signal and information carried by the first PUCCH and transmitting on the first PUCCH, and transmitting the second PUCCH on a different time-domain resource.

In one implementation, the transmission mode may be any combination of the above transmission modes, which will not be elaborated herein.

In one implementation, which of the above transmission modes to adopt can be determined according to the CORESET pool index associated with the first uplink signal or the spatial relation information, the signal type, or the TCI state of the first uplink signal. For details thereof, reference can be made to descriptions of the foregoing examples.

As can be seen, in this embodiment of the disclosure, the terminal determines the transmission mode of at least one of the first uplink signal, the first PUCCH, and the second PUCCH according to the ACK/NACK feedback mode configured by the network and transmits multiplexed data, which can improve information transmission efficiency and save channel resources. A network device can configure, according to a present backhaul condition, whether to adopt separate feedback or adopt joint feedback, thereby supporting uplink information multiplexing under different backhaul conditions and transmitting as much uplink information as possible in case of resource collision.

In a possible example, when the first PUCCH and the second PUCCH both overlap with the time-domain resource of the first uplink signal, the transmission mode of at least one of the first uplink signal, the first PUCCH, and the second PUCCH is determined as follows. The transmission mode of at least one of the first uplink signal, the first PUCCH, and the second PUCCH is determined according to a preset rule.

In one implementation, when the first PUCCH and the second PUCCH both overlap with the first uplink signal in time domain, the terminal device determines a multiplexing mode of the first uplink signal and a target PUCCH according to the preset rule, where the target PUCCH is the first PUCCH and/or the second PUCCH. The first PUCCH and the second PUCCH are associated with different CORESET pool indexes.

In one implementation, the method can be applied to a case where an ACK/NACK feedback mode configured by a network is separate feedback. In other words, the method may be further described as follows. When the ACK/NACK feedback mode configured by the network is separate feedback and the first PUCCH and the second PUCCH both overlap with the first uplink signal in time domain, the multiplexing mode of the first uplink signal and the target PUCCH is determined according to the preset rule, where the target PUCCH is the first PUCCH and/or the second PUCCH. The first PUCCH and the second PUCCH do not overlap in time domain and are associated with different CORESET pool indexes.

As can be seen, in this embodiment of the disclosure, in case the terminal is unable to determine a TRP (that is, associated CORESET pool index) corresponding to the first uplink signal, by determining the multiplexing mode according to the preset rule, it is possible to avoid discard of all uplink information with resource collision by the terminal, thereby transmitting as much uplink information as possible.

In a possible example, the preset rule includes at least one of: the first uplink signal and one of the first PUCCH and the second PUCCH which has an associated CORESET pool index of a preset value are multiplexed and transmitted; the first uplink signal and one of the first PUCCH and the second PUCCH which is earlier are multiplexed and transmitted; the first uplink signal and one of the first PUCCH and the second PUCCH which has an earlier triggering DCI are multiplexed and transmitted; the first uplink signal and one of the first PUCCH and the second PUCCH which has an earlier transmission time of a corresponding PDSCH are multiplexed and transmitted; or the first uplink signal and one of the first PUCCH and the second PUCCH which has a triggering DCI adopting an agreed DCI format are multiplexed and transmitted.

In one implementation, the preset rule may be: the first uplink signal and one of the first PUCCH and the second PUCCH which has an associated CORESET pool index of the preset value are multiplexed and transmitted.

The first uplink signal may be multiplexed and transmitted with a PUCCH which has an associated CORESET pool index of 0, or may be multiplexed and transmitted with a PUCCH which has an associated CORESET pool index of 1.

For example, a CORESET pool index associated with the first PUCCH is 0, and a CORESET pool index associated with the second PUCCH is 1. In this case, the first uplink signal may be multiplexed and transmitted with the first PUCCH.

In one implementation, the preset rule may be: the first uplink signal and one of the first PUCCH and the second PUCCH which is earlier are multiplexed and transmitted.

For example, if an OFDM symbol occupied by the first PUCCH is earlier than that occupied by the second PUCCH, the first uplink signal is multiplexed and transmitted with the first PUCCH rather than the second PUCCH.

In one implementation, the preset rule may be: the first uplink signal and one of the first PUCCH and the second PUCCH which has an earlier triggering DCI are multiplexed and transmitted.

If the first PUCCH carries HARQ-ACK, triggering DCI of the first PUCCH may be DCI used for scheduling a PDSCH corresponding to the HARQ-ACK. If the second PUCCH carries HARQ-ACK, triggering DCI of the second PUCCH may be DCI used for scheduling a PDSCH corresponding to the HARQ-ACK.

For example, in a situation where the first PUCCH and the second PUCCH carry HARQ-ACK information, if a PDSCH corresponding to the HARQ-ACK carried by one of the first PUCCH and the second PUCCH has an earlier scheduling DCI, the first uplink signal and the above PUCCH corresponding to the earlier scheduling DCI are multiplexed and transmitted.

If the first PUCCH carries CSI, triggering DCI of the first PUCCH may be DCI used for triggering the CSI. If the second PUCCH carries CSI, triggering DCI of the second PUCCH may be DCI used for triggering the CSI.

For example, in a situation where the first PUCCH and the second PUCCH carry CSI information, if a PDSCH of the CSI carried by one of the first PUCCH and the second PUCCH has an earlier scheduling DCI, the first uplink signal and the above PUCCH corresponding to the earlier scheduling DCI are multiplexed and transmitted.

In one implementation, the preset rule may be: the first uplink signal and one of the first PUCCH and the second PUCCH which has an earlier transmission time of a corresponding PDSCH are multiplexed and transmitted.

For example, in a situation where the first PUCCH and the second PUCCH carry HARQ-ACK information, if the HARQ-ACK carried by one of the first PUCCH and the second PUCCH has an earlier PDSCH, the first uplink signal and the above PUCCH corresponding to the earlier PDSCH are multiplexed and transmitted.

In one implementation, the preset rule may be: the first uplink signal and one of the first PUCCH and the second PUCCH which has a triggering DCI adopting an agreed DCI format are multiplexed and transmitted.

The agreed DCI format may be a specified DCI format, such as DCI format 1_0 or DCI format 0_0.

For example, triggering DCI of the first PUCCH adopts DCI format 1_0, and triggering DCI of the second PUCCH adopts DCI format 1_1. The first uplink signal and the first PUCCH are multiplexed and transmitted.

In one implementation, the preset rule may be any combination of the above preset rules, which will not be elaborated herein.

It is to be further explained that, the above transmission mode may be pre-set, or may be determined according to information carried by the first PUCCH, information carried by the second PUCCH, and information carried by the first uplink signal. As can be seen, in this embodiment of the disclosure, in case the terminal is unable to determine a TRP (that is, associated CORESET pool index) corresponding to the first uplink signal, by determining the transmission mode according to the preset rule, it is possible to solve a problem of discarding all uplink information with resource collision by the terminal, thereby transmitting as much uplink information as possible.

In a possible example, when the first PUCCH and the second PUCCH both overlap with the time-domain resource of the first uplink signal, the transmission mode of at least one of the first uplink signal, the first PUCCH, and the second PUCCH is determined as follows. Determine not to transmit the first PUCCH, the second PUCCH, and the first uplink signal.

In other words, in this method, when the first PUCCH and the second PUCCH both overlap with the time-domain resource of the first uplink signal, the transmission mode of at least one of the first uplink signal, the first PUCCH, and the second PUCCH is: not to transmit the first PUCCH, the second PUCCH, and the first uplink signal.

In this example, the method can be applied to a scenario in which an ACK/NACK feedback mode configured by a network is separate feedback. In this case, the method can be described as follows. When the ACK/NACK feedback mode configured by the network is separate feedback and the first PUCCH and the second PUCCH both overlap with the first uplink signal in time domain, determine not to transmit the first PUCCH, the second PUCCH, and the first uplink signal. The first PUCCH and the second PUCCH are associated with different CORESET pool indexes.

In this example, the method can also be described as follows. When the ACK/NACK feedback mode configured by a network is separate feedback and the first PUCCH and the second PUCCH are associated with different CORESET pool indexes, the terminal does not expect that the first PUCCH and the second PUCCH both overlap with the first uplink signal in time domain. Once such overlap in time domain occurs, the terminal regards it as an error case and does not transmit the first PUCCH, the second PUCCH, and the first uplink signal, and information transmitted on these channels will be discarded.

As can be seen, in this embodiment of the disclosure, through resource scheduling of a base station, simultaneous resource collision of one uplink signal with PUCCHs of different TRPs can be solved, thereby avoiding as such as possible uplink information discarding by the terminal and reducing processing complexity of information multiplexing of the terminal.

In a possible example, the first uplink signal includes any one of: a PUSCH, a PUCCH carrying CSI, or a PUCCH carrying an SR.

The PUSCH may be a PUSCH scheduled by DCI, or may be a PUSCH scheduled by RRC.

In a possible example, when the first PUCCH carries first HARQ-ACK, a CORESET pool index associated with the first PUCCH is a CORESET pool index of a CORESET carrying a PDCCH for scheduling a PDSCH corresponding to the first HARQ-ACK. When the second PUCCH carries second HARQ-ACK, a CORESET pool index associated with the second PUCCH is a CORESET pool index of a CORESET carrying a PDCCH for scheduling a PDSCH corresponding to the second HARQ-ACK.

The CORESET pool index associated with the first PUCCH may be 1, 0, or a preset value.

In a possible example, when the first PUCCH carries CSI, a CORESET pool index associated with the first PUCCH is a CORESET pool index associated with a PUCCH resource of the first PUCCH and configured by higher-layer signaling, or the CORESET pool index associated with the first PUCCH is a CORESET pool index associated with a CSI reporting configuration corresponding to the CSI.

When the second PUCCH also carries CSI, determination can be made in a similar manner, that is, a CORESET pool index associated with the second PUCCH is a CORESET pool index associated with a PUCCH resource of the second PUCCH and configured by higher-layer signaling, or the CORESET pool index associated with the second PUCCH is a CORESET pool index associated with a CSI reporting configuration corresponding to the CSI.

The CORESET pool index associated with a PUCCH resource of the first PUCCH and configured by higher-layer signaling may be 1, 0, or a preset value. The CORESET pool index associated with a CSI reporting configuration corresponding to the CSI may be 1, 0, or a preset value.

In a possible example, when the first PUCCH carries an SR, a CORESET pool index associated with the first PUCCH is a CORESET pool index associated with a PUCCH resource of the first PUCCH and configured by higher-layer signaling, or the CORESET pool index associated with the first PUCCH is 0.

The CORESET pool index associated with a PUCCH resource of the first PUCCH and configured by higher-layer signaling may be 1, 0, or a preset value.

When the second PUCCH also carries an SR, determination can be made in a similar manner, that is, a CORESET pool index associated with the second PUCCH is a CORESET pool index associated with a PUCCH resource of the second PUCCH and configured by higher-layer signaling, or the CORESET pool index associated with the second PUCCH is 0.

In a possible example, the first PUCCH does not overlap with the second PUCCH in time domain.

"The first PUCCH does not overlap with the second PUCCH in time domain" specifically means that the first PUCCH and the second PUCCH occupy different OFDM symbols in one slot.

In a possible example, the first PUCCH does not overlap with the second PUCCH in time domain refers to: the first PUCCH and the second PUCCH occupy different OFDM symbols in one slot.

"The first PUCCH and the second PUCCH occupy different OFDM symbols in one slot" may mean that the first PUCCH and the second PUCCH occupy different OFDM symbols that are adjacent in one slot, or may mean that the first PUCCH and the second PUCCH occupy different OFDM symbols that are not adjacent in one slot.

In a possible example, after determining the transmission mode of at least one of the first uplink signal, the first PUCCH, and the second PUCCH when the first PUCCH and the second PUCCH both overlap with the time-domain resource of the first uplink signal, the method further includes the following. At least one signal among the first PUCCH, the second PUCCH, and the first uplink signal is transmitted according to the transmission mode.

In this example, if the transmission mode is determining not to transmit the first PUCCH, the second PUCCH, and the first uplink signal, the terminal does not transmit the first PUCCH, the second PUCCH, and the first uplink signal. If the transmission mode is not the above manner, the method further includes the following after determining the transmission mode of the first uplink signal and a target PUCCH. At least one signal among the first PUCCH, the second PUCCH, and the first uplink signal is transmitted according to the transmission mode. For details of the transmission mode, reference can be made to descriptions of the foregoing examples. In a possible example, the method further includes the following. Indication information of an ACK/NACK feedback mode configured by a network is received, where the ACK/NACK feedback mode indicated by the indication information is separate feedback.

As illustrated in FIG. 3, implementations of the disclosure provide a method for information transmission. The method is applicable to a network device. The method includes the following operations.

S301, the network device transmits first configuration information, second configuration information, and third configuration information to a terminal. The first configuration information is used for configuring a first PUCCH, the second configuration information is used for configuring a second PUCCH, and the third configuration information is used for configuring a first uplink signal, where the first PUCCH and the second PUCCH are associated with different CORESET pool indexes. Accordingly, a terminal device receives the first configuration information, the second configuration information, and the third configuration information from the network device. The first PUCCH and the second PUCCH do not overlap simultaneously with the first uplink signal in time domain.

"The first PUCCH and the second PUCCH do not overlap simultaneously with the first uplink signal in time domain" means that when determining the first configuration information, the second configuration information, and the third configuration information, the network device cannot configure the first PUCCH and the second PUCCH to overlap simultaneously with the first uplink signal in time domain. In other words, the following case is excluded: the first PUCCH overlaps with the first uplink signal in time domain, and the second PUCCH overlaps with the first uplink signal in time domain.

In one implementation, if an ACK/NACK feedback mode configured by a network is separate feedback and the first PUCCH and the second PUCCH configured are associated with different CORESET pool indexes, the network device cannot configure the first PUCCH and the second PUCCH to overlap simultaneously with the first uplink signal. When configuring resources of the first PUCCH, resources of the second PUCCH, and resources of the first uplink signal, the network device should avoid such a case. Otherwise, the terminal device may not transmit these signals.

As can be seen, in this embodiment of the disclosure, through resource scheduling of a base station, simultaneous resource collision of one uplink signal with PUCCHs of different TRPs can be avoided, thereby avoiding as such as possible uplink information discarding by the terminal and reducing processing complexity of information multiplexing of the terminal.

In a possible example, when the first PUCCH carries first HARQ-ACK, a CORESET pool index associated with the first PUCCH is a CORESET pool index of a CORESET carrying a PDCCH for scheduling a PDSCH corresponding to the first HARQ-ACK. When the second PUCCH carries second HARQ-ACK, a CORESET pool index associated with the second PUCCH is a CORESET pool index of a CORESET carrying a PDCCH for scheduling a PDSCH corresponding to the second HARQ-ACK.

The CORESET pool index associated with the first PUCCH may be 1, 0, or a preset value. The CORESET pool index associated with the second PUCCH may be 1, 0, or a preset value.

In a possible example, when the first PUCCH carries CSI, a CORESET pool index associated with the first PUCCH is any one of: a CORESET pool index associated with a PUCCH resource of the first PUCCH and configured by higher-layer signaling, or a CORESET pool index associated with a CSI reporting configuration corresponding to the CSI.

When the first PUCCH carries CSI, the CORESET pool index associated with the first PUCCH may be the CORESET pool index associated with a PUCCH resource of the first PUCCH and configured by higher-layer signaling, or may be the CORESET pool index associated with a CSI reporting configuration corresponding to the CSI.

In a possible example, when the first PUCCH carries an SR, a CORESET pool index associated with the first PUCCH is any one of: a CORESET pool index associated with a PUCCH resource of the first PUCCH and configured by higher-layer signaling, or the CORESET pool index associated with the first PUCCH is 0.

When the first PUCCH carries an SR, the CORESET pool index associated with the first PUCCH may be the CORESET pool index associated with a PUCCH resource of the first PUCCH and configured by higher-layer signaling, or the CORESET pool index associated with the first PUCCH is 0. The CORESET pool index associated with a PUCCH resource of the first PUCCH and configured by higher-layer signaling may be 1, 0, or a preset value.

In a possible example, the first PUCCH does not overlap with the second PUCCH in time domain.

In a possible example, the first PUCCH does not overlap with the second PUCCH in time domain refers to: the first PUCCH and the second PUCCH occupy different OFDM symbols in one slot.

"The first PUCCH and the second PUCCH occupy different OFDM symbols in one slot" may mean that the first PUCCH and the second PUCCH occupy different OFDM symbols that are adjacent in one slot, or may mean that the first PUCCH and the second PUCCH occupy different OFDM symbols that are not adjacent in one slot.

In a possible example, the first uplink signal includes any one of: a PUSCH, a PUCCH carrying CSI, or a PUCCH carrying an SR.

The PUSCH may be a PUSCH scheduled by DCI, or may be a PUSCH scheduled by RRC.

In a possible example, fourth configuration information is transmitted to the terminal, where the fourth configuration information is used for configuring an ACK/NACK feedback mode to be separate feedback.

In a possible example, the method further includes the following after determining that the first PUCCH and the second PUCCH do not overlap simultaneously with the first uplink signal in time domain. At least one signal among the first PUCCH, the second PUCCH, and the first uplink signal is received from the terminal.

Consistent with implementations illustrated in FIG. 2A, refer to FIG. 4, which is a schematic structural diagram of a terminal 400 provided in implementations of the disclosure. As illustrated in FIG. 4, the terminal 400 includes a processor 410, a memory 420, a communication interface 440, and one or more programs 421. The one or more programs 421 are stored in the memory 420 and configured to be executed by the processor 410. The one or more programs 421 include instructions for performing the following operations.

A transmission mode of at least one of a first uplink signal, a first PUCCH, and a second PUCCH is determined when the first PUCCH and the second PUCCH both overlap with a time-domain resource of the first uplink signal. The first PUCCH and the second PUCCH are associated with different CORESET pool indexes.

As can be seen, in this embodiment of the disclosure, when the first PUCCH and the second PUCCH both overlap with the time-domain resource of the first uplink signal, the terminal determines the transmission mode of at least one of a first uplink signal, a first PUCCH, and a second PUCCH, transmits multiplexed information according to the transmission mode, and gives priority to transmission of the multiplexed information, which is possible to reduce discard of information to the least, improve transmission efficiency of uplink control information, and save channel resources.

In a possible example, in terms of determining the transmission mode of at least one of the first uplink signal, the first PUCCH, and the second PUCCH when the first PUCCH and the second PUCCH both overlap with the time-domain resource of the first uplink signal, the programs include instructions for performing the following operations. The transmission mode of at least one of the first uplink signal, the first PUCCH, and the second PUCCH is determined according to first information. The first information includes at least one of: a CORESET pool index associated with the first uplink signal, spatial relation information of the first uplink signal, a signal type of the first uplink signal, a TCI state of the first uplink signal, a type of information carried by the first uplink signal, or an ACK/NACK feedback mode configured by a network.

In a possible example, the first information includes the CORESET pool index associated with the first uplink signal. In terms of determining the transmission mode of at least one of the first uplink signal, the first PUCCH, and the second PUCCH according to the first information, the programs include instructions for performing the following operations. Determine to multiplex and transmit the first uplink signal and the first PUCCH when the CORESET pool index associated with the first uplink signal is the same as that associated with the first PUCCH, and/or determine not to transmit the second PUCCH or to transmit the first PUCCH and the second PUCCH on different time-domain resources when the CORESET pool index associated with the first uplink signal is different from that associated with the second PUCCH.

In a possible example, the first information includes the spatial relation information of the first uplink signal. In terms of determining the transmission mode of at least one of the first uplink signal, the first PUCCH, and the second PUCCH according to the first information, the programs include instructions for performing the following operations. Determine to multiplex and transmit the first uplink signal and the first PUCCH when a reference source signal indicated by the spatial relation information of the first uplink signal is the same as that indicated by spatial relation information of the first PUCCH, and/or determine not to transmit the second PUCCH or to transmit the first PUCCH and the second PUCCH on different time-domain resources when the reference source signal indicated by the spatial relation information of the first uplink signal is different from that indicated by spatial relation information of the second PUCCH.

In a possible example, the first information includes the signal type of the first uplink signal. In terms of determining the transmission mode of at least one of the first uplink signal, the first PUCCH, and the second PUCCH according to the first information, the programs include instructions for performing at least one of the following operations. When the first uplink signal is a PUSCH, information carried by the first PUCCH and data carried by the PUSCH are transmitted on the PUSCH and determine not to transmit the second PUCCH. When the first uplink signal is a PUSCH, the first PUCCH and the second PUCCH are transmitted to a network device on different time-domain resources without transmitting the first uplink signal. When the first uplink signal is a PUSCH scheduled by RRC, the first PUCCH and the second PUCCH are transmitted to the network device without transmitting the first uplink signal. When the first uplink signal is a third PUCCH, information carried by the first PUCCH and information carried by the third PUCCH are transmitted on the first PUCCH, the third PUCCH, or a fourth PUCCH.

In a possible example, the first information includes the TCI state of the first uplink signal. In terms of determining the transmission mode of at least one of the first uplink signal, the first PUCCH, and the second PUCCH according to the first information, the programs include instructions for performing the following operations. Multiplex and transmit the first uplink signal and the first PUCCH when a reference source signal indicated by the TCI state of the first uplink signal is the same as that indicated by a TCI state or spatial relation information of the first PUCCH, and/or not transmit the second PUCCH or transmit the first PUCCH and the second PUCCH on different time-domain resources when the reference source signal indicated by the TCI state of the first uplink signal is different from that indicated by the TCI state or the spatial relation information of the first PUCCH.

In a possible example, the first information includes the type of information carried by the first uplink signal. In terms of determining the transmission mode of at least one of the first uplink signal, the first PUCCH, and the second PUCCH according to the first information, the programs include instructions for performing at least one of the following operations. When the first uplink signal carries data and the first PUCCH and the second PUCCH carry CSI, determine to transmit information carried by the first PUCCH and data carried by the first uplink signal on the first uplink signal and determine not to transmit the second PUCCH. When the first uplink signal carries data and the first PUCCH and the second PUCCH carry HARQ-ACK, determine to transmit to a network device the first PUCCH and the second PUCCH on different time-domain resources and not to transmit the first uplink signal. When the first uplink signal carries CSI and the first PUCCH and the second PUCCH carry CSI, determine to transmit information carried by the first PUCCH and information carried by the first uplink signal on the first uplink signal and determine not to transmit the second PUCCH, or determine to transmit information carried by the first PUCCH and information carried by the first uplink signal on the first PUCCH and transmit the second PUCCH on a different time-domain resource. When the first uplink signal carries CSI and the first PUCCH and the second PUCCH carry HARQ, determine to transmit to the network device the first PUCCH and the second PUCCH on different time-domain resources and determine not to transmit the first uplink signal. When the first uplink signal carries an SR and the first PUCCH and the second PUCCH carry CSI, determine to transmit information carried by the first PUCCH and information carried by the first uplink signal on the first PUCCH and determine to transmit the second PUCCH on a different time-domain resource. When the first uplink signal carries an SR and the first PUCCH and the second PUCCH carry HARQ, determine to transmit information carried by the first PUCCH and information carried by the first uplink signal on the first PUCCH and determine to transmit the second PUCCH on a different time-domain resource.

In a possible example, when the first uplink signal is a third PUCCH, the first uplink signal and the first PUCCH are multiplexed and transmitted as follows. Information carried by the first PUCCH and information carried by the third PUCCH are multiplexed, and the multiplexed information is transmitted on the first PUCCH or the third PUCCH.

In a possible example, when the first uplink signal is a PUSCH, multiplexing and transmission of the first uplink signal and the first PUCCH refers to: information carried by the first PUCCH and data in the PUSCH are multiplexed and the multiplexed data is transmitted on the PUSCH.

In a possible example, information in the first uplink signal and information in the first PUCCH are multiplexed and transmitted on the first PUCCH, and the second PUCCH is transmitted on a different time-domain resource.

In a possible example, transmission of the first PUCCH and the second PUCCH on different time-domain resources specifically refers to: the first PUCCH and the second PUCCH are transmitted on different time-domain resources without transmitting the first uplink signal.

In a possible example, the first information includes the ACK/NACK feedback mode configured by the network. The transmission mode of at least one of the first uplink signal, the first PUCCH, and the second PUCCH is determined according to the first information as follows. When the ACK/NACK feedback mode is joint feedback, determine to multiplex information carried by the first PUCCH, information carried by the second PUCCH, and information carried by the first uplink signal and transmit on a same PUCCH or PUSCH. And/or, when the ACK/NACK feedback mode is separate feedback, determining the transmission mode of at least one of the first uplink signal, the first PUCCH, and the second PUCCH includes at least one of the following. Determine not to transmit the first uplink signal, the first PUCCH, and the second PUCCH. Determine to multiplex information carried by the first uplink signal and information carried by the first PUCCH and transmit on the first uplink signal, and determine not to transmit the second PUCCH. Determine to transmit the first PUCCH and the second PUCCH, and determine not to transmit the first uplink signal. Multiplex information carried by the first uplink signal and information carried by the first PUCCH and determine to transmit on the first PUCCH, and determine to transmit the second PUCCH on a different time-domain resource.

In a possible example, when the first PUCCH and the second PUCCH both overlap with the time-domain resource of the first uplink signal, the transmission mode of at least one of the first uplink signal, the first PUCCH, and the second PUCCH is determined as follows. The transmission mode of at least one of the first uplink signal, the first PUCCH, and the second PUCCH is determined according to a preset rule.

In a possible example, the preset rule includes at least one of: the first uplink signal and one of the first PUCCH and the second PUCCH which has an associated CORESET pool index of a preset value are multiplexed and transmitted; the first uplink signal and one of the first PUCCH and the second PUCCH which is earlier are multiplexed and transmitted; the first uplink signal and one of the first PUCCH and the second PUCCH which has an earlier triggering DCI are multiplexed and transmitted; the first uplink signal and one of the first PUCCH and the second PUCCH which has an earlier transmission time of a corresponding PDSCH are multiplexed and transmitted; or the first uplink signal and one of the first PUCCH and the second PUCCH which has a triggering DCI adopting an agreed DCI format are multiplexed and transmitted.

In a possible example, when the first PUCCH and the second PUCCH both overlap with the time-domain resource of the first uplink signal, the transmission mode of at least one of the first uplink signal, the first PUCCH, and the second PUCCH is determined as follows. Determine not to transmit the first PUCCH, the second PUCCH, and the first uplink signal.

In a possible example, the first uplink signal includes any one of: a PUSCH, a PUCCH carrying CSI, or a PUCCH carrying an SR.

In a possible example, when the first PUCCH carries first HARQ-ACK, a CORESET pool index associated with the first PUCCH is a CORESET pool index of a CORESET carrying a PDCCH for scheduling a PDSCH corresponding to the first HARQ-ACK. When the second PUCCH carries second HARQ-ACK, a CORESET pool index associated with the second PUCCH is a CORESET pool index of a CORESET carrying a PDCCH for scheduling a PDSCH corresponding to the second HARQ-ACK.

In a possible example, when the first PUCCH carries CSI, a CORESET pool index associated with the first PUCCH is a CORESET pool index associated with a PUCCH resource of the first PUCCH and configured by higher-layer signaling, or the CORESET pool index associated with the first PUCCH is a CORESET pool index associated with a CSI reporting configuration corresponding to the CSI.

In a possible example, when the first PUCCH carries an SR, a CORESET pool index associated with the first PUCCH is a CORESET pool index associated with a PUCCH resource of the first PUCCH and configured by higher-layer signaling, or the CORESET pool index associated with the first PUCCH is 0.

In a possible example, the first PUCCH does not overlap with the second PUCCH in time domain.

In a possible example, the first PUCCH does not overlap with the second PUCCH in time domain refers to: the first PUCCH and the second PUCCH occupy different OFDM symbols in one slot.

In a possible example, the programs further include instructions for performing the following operations after determining the transmission mode of at least one of the first uplink signal, the first PUCCH, and the second PUCCH when the first PUCCH and the second PUCCH both overlap with the time-domain resource of the first uplink signal. At least one signal among the first PUCCH, the second PUCCH, and the first uplink signal is transmitted according to the transmission mode.

In a possible example, the programs further include instructions for performing the following operations. Indication information of an ACK/NACK feedback mode configured by a network is received, where the ACK/NACK feedback mode indicated by the indication information is separate feedback.

As can be seen, in implementations of the disclosure, the terminal device determines the transmission mode of at least one of the first uplink signal, the first PUCCH, and the second PUCCH when the first PUCCH and the second PUCCH both overlap with the time-domain resource of the first uplink signal, which solves a problem that the terminal device is unable to determine how to transmit uplink signals in case HARQ-ACKs corresponding to PDSCHs of different TRPs overlap simultaneously with another uplink signal in time, thereby improving information transmission efficiency and saving channel resources. The network device transmits the first configuration information, the second configuration information, and the third configuration information to the terminal. The first configuration information is used for configuring the first PUCCH, the second configuration information is used for configuring the second PUCCH, and the third configuration information is used for configuring the first uplink signal. The first PUCCH and the second PUCCH are associated with different CORESET pool indexes. The first PUCCH and the second PUCCH do not overlap simultaneously with the first uplink signal in time domain. Through resource scheduling of a base station, simultaneous resource collision of one uplink signal with PUCCHs of different TRPs can be solved, thereby avoiding as such as possible uplink information discarding by the terminal needs and reducing processing complexity of information multiplexing of the terminal.

Figure 5:
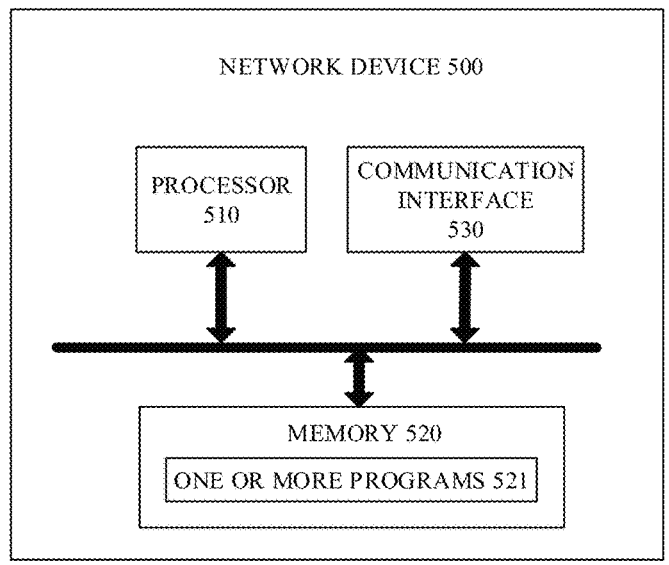
FIG. 5 is a schematic structural diagram of a network device provided in implementations of the disclosure.

Refer to FIG. 5, which is a schematic structural diagram of a network device 500 provided in implementations of the disclosure. As illustrated in FIG. 5, the network device 500 includes a processor 510, a memory 520, a communication interface 530, and one or more programs 521. The one or more programs 521 are stored in the memory 520 and configured to be executed by the processor 510. The one or more programs 521 include instructions for performing the following operations.

First configuration information, second configuration information, and third configuration information are transmitted to a terminal. The first configuration information is used for configuring a first PUCCH, the second configuration information is used for configuring a second PUCCH, and the third configuration information is used for configuring a first uplink signal. The first PUCCH and the second PUCCH are associated with different CORESET pool indexes. The first PUCCH and the second PUCCH do not overlap simultaneously with the first uplink signal in time domain.

As can be seen, in this embodiment of the disclosure, the network device transmits the first configuration information, the second configuration information, and the third configuration information to the terminal. The first configuration information is used for configuring the first PUCCH, the second configuration information is used for configuring the second PUCCH, and the third configuration information is used for configuring the first uplink signal. The first PUCCH and the second PUCCH are associated with different CORESET pool indexes. Determine that the first PUCCH and the second PUCCH do not overlap simultaneously with the first uplink signal in time domain. As such, it is possible to improve transmission efficiency of uplink control information of the terminal and save channel resources.

In a possible example, when the first PUCCH carries first HARQ-ACK, a CORESET pool index associated with the first PUCCH is a CORESET pool index of a CORESET carrying a PDCCH for scheduling a PDSCH corresponding to the first HARQ-ACK. When the second PUCCH carries second HARQ-ACK, a CORESET pool index associated with the second PUCCH is a CORESET pool index of a CORESET carrying a PDCCH for scheduling a PDSCH corresponding to the second HARQ-ACK.

In a possible example, when the first PUCCH carries CSI, a CORESET pool index associated with the first PUCCH is any one of: a CORESET pool index associated with a PUCCH resource of the first PUCCH and configured by higher-layer signaling, or a CORESET pool index associated with a CSI reporting configuration corresponding to the CSI.

In a possible example, when the first PUCCH carries an SR, a CORESET pool index associated with the first PUCCH is any one of: a CORESET pool index associated with a PUCCH resource of the first PUCCH and configured by higher-layer signaling, or the CORESET pool index associated with the first PUCCH is 0.

In a possible example, the first PUCCH does not overlap with the second PUCCH in time domain.

In a possible example, the first PUCCH does not overlap with the second PUCCH in time domain refers to: the first PUCCH and the second PUCCH occupy different OFDM symbols in one slot.

In a possible example, the first uplink signal includes any one of: a PUSCH, a PUCCH carrying CSI, or a PUCCH carrying an SR.

In a possible example, the programs further include instructions for performing the following operations. Fourth configuration information is transmitted to the terminal, where the fourth configuration information is used for configuring an ACK/NACK feedback mode to be separate feedback.

In a possible example, the programs further include instructions for performing the following operations after determining that the first PUCCH and the second PUCCH do not overlap simultaneously with the first uplink signal in time domain. At least one signal among the first PUCCH, the second PUCCH, and the first uplink signal is received from the terminal.

Technical solutions of implementations of the disclosure have been elaborated above from the perspective of interaction between various network elements. It can be understood that, in order to implement the above functions, the terminal includes hardware structures and/or software modules for performing respective functions. Those of ordinary skill in the art will appreciate that units and algorithmic operations of various examples described in connection with implementations of the disclosure can be implemented by hardware or by a combination of hardware and computer software in the disclosure. Whether these functions are performed by means of hardware or hardware driven by computer software depends on the particular application and the design constraints of the associated technical solution. Those skilled in the art may use different methods with regard to each particular application to implement the described functionality, but such methods should not be regarded as lying beyond the scope of the disclosure.

Division of functional units of the terminal may be implemented according to the above method implementations in implementations of the disclosure. For example, various functional units may be divided to be in one-to-one correspondence with each function, or two or more functions may be integrated into one processing unit. The integrated unit may be implemented in the form of hardware, or may be implemented in the form of software program module. It is to be noted that, division of units in implementations of the disclosure is illustrative and is only a division of logical functions, and there may exist other manners of division in practice.

Figure 6:
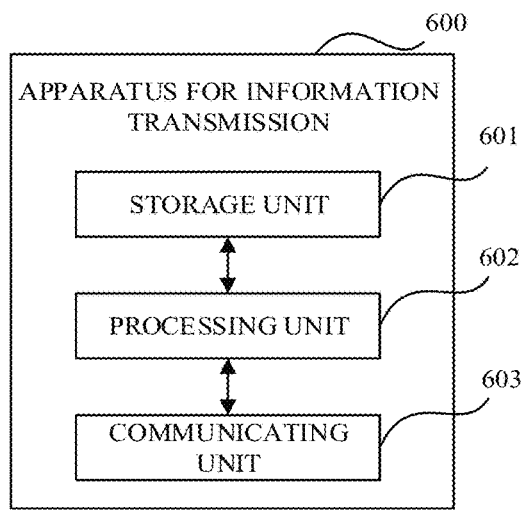
FIG. 6 is a block diagram of functional units of an apparatus for information transmission provided in implementations of the disclosure.

If the integrated unit is adopted, FIG. 6 illustrates a possible block diagram of functional units of an apparatus for information transmission provided in the foregoing implementations of the disclosure. The apparatus 600 for information transmission is applicable to a terminal and specifically includes a processing unit 602 and a communicating unit 603. The processing unit 602 is configured to control and manage operations of the terminal. For example, the processing unit 602 is configured to support the terminal to perform step 201 illustrated in FIG. 2A and/or other processes described in the technical solutions of the disclosure. The communicating unit 603 is configured to support the terminal to communicate with other devices. The terminal may further include a storage unit 601. The storage unit 601 is configured to store program codes and data of the terminal.

The processing unit 602 may be a processor or a controller and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits disclosed in implementations of the disclosure can be implemented or executed. The processor may also be a combination for implementing computing functions, for example, one or more microprocessors, a combination of DSP and microprocessor, or the like. The communicating unit 603 may be a communication interface, a transceiver, a transceiver circuit, etc. The storage unit 601 may be a memory. When the processing unit 602 is a processor, the communicating unit 603 is a communication interface, and the storage unit 601 is a memory, the terminal in this embodiment of the disclosure may be the terminal illustrated in FIG. 4.

In one implementation, the processing unit 602 is configured to implement any step performed by the terminal in the foregoing method implementations. In addition, when performing data transmission such as transmitting, the processing unit 602 can selectively invoke the communicating unit 603 to complete the corresponding operation. The following will give an elaboration.

The processing unit 602 is configured to determine a transmission mode of at least one of a first uplink signal, a first PUCCH, and a second PUCCH when the first PUCCH and the second PUCCH both overlap with a time-domain resource of the first uplink signal, where the first PUCCH and the second PUCCH are associated with different CORESET pool indexes.

In a possible example, in terms of determining the transmission mode of at least one of the first uplink signal, the first PUCCH, and the second PUCCH when the first PUCCH and the second PUCCH both overlap with the time-domain resource of the first uplink signal, the processing unit is specifically configured to determine the transmission mode of at least one of the first uplink signal, the first PUCCH, and the second PUCCH according to first information. The first information includes at least one of: a CORESET pool index associated with the first uplink signal, spatial relation information of the first uplink signal, a signal type of the first uplink signal, a TCI state of the first uplink signal, a type of information carried by the first uplink signal, or an ACK/NACK feedback mode configured by a network.

In a possible example, the first information includes the CORESET pool index associated with the first uplink signal. In terms of determining the transmission mode of at least one of the first uplink signal, the first PUCCH, and the second PUCCH according to the first information, the processing unit is specifically configured to determine to multiplex and transmit the first uplink signal and the first PUCCH when the CORESET pool index associated with the first uplink signal is the same as that associated with the first PUCCH, and/or determine not to transmit the second PUCCH or to transmit the first PUCCH and the second PUCCH on different time-domain resources when the CORESET pool index associated with the first uplink signal is different from that associated with the second PUCCH.

In a possible example, the first information includes the spatial relation information of the first uplink signal. In terms of determining the transmission mode of at least one of the first uplink signal, the first PUCCH, and the second PUCCH according to the first information, the processing unit is specifically configured to determine to multiplex and transmit the first uplink signal and the first PUCCH when a reference source signal indicated by the spatial relation information of the first uplink signal is the same as that indicated by spatial relation information of the first PUCCH, and/or determine not to transmit the second PUCCH or to transmit the first PUCCH and the second PUCCH on different time-domain resources when the reference source signal indicated by the spatial relation information of the first uplink signal is different from that indicated by spatial relation information of the second PUCCH.

In a possible example, the first information includes the signal type of the first uplink signal. In terms of determining the transmission mode of at least one of the first uplink signal, the first PUCCH, and the second PUCCH according to the first information, the processing unit is specifically configured to perform at least one of: transmit information carried by the first PUCCH and data carried by a PUSCH on the PUSCH and determine not to transmit the second PUCCH, when the first uplink signal is the PUSCH; transmit to a network device the first PUCCH and the second PUCCH on different time-domain resources and not transmit the first uplink signal, when the first uplink signal is a PUSCH; transmit to the network device the first PUCCH and the second PUCCH and not transmit the first uplink signal, when the first uplink signal is a PUSCH scheduled by RRC; or transmit information carried by the first PUCCH and information carried by a third PUCCH on the first PUCCH, the third PUCCH, or a fourth PUCCH, when the first uplink signal is the third PUCCH.

In a possible example, the first information includes the TCI state of the first uplink signal. In terms of determining the transmission mode of at least one of the first uplink signal, the first PUCCH, and the second PUCCH according to the first information, the processing unit is specifically configured: to multiplex and transmit the first uplink signal and the first PUCCH, when a reference source signal indicated by the TCI state of the first uplink signal is the same as that indicated by a TCI state or spatial relation information of the first PUCCH; and/or not transmit the second PUCCH or transmit the first PUCCH and the second PUCCH on different time-domain resources, when the reference source signal indicated by the TCI state of the first uplink signal is different from that indicated by the TCI state or the spatial relation information of the first PUCCH.

In a possible example, the first information includes the type of information carried by the first uplink signal. In terms of determining the transmission mode of at least one of the first uplink signal, the first PUCCH, and the second PUCCH according to the first information, the processing unit is specifically configured to perform at least one of: determine to transmit information carried by the first PUCCH and data carried by the first uplink signal on the first uplink signal and determine not to transmit the second PUCCH, when the first uplink signal carries data and the first PUCCH and the second PUCCH carry CSI; determine to transmit to a network device the first PUCCH and the second PUCCH on different time-domain resources and not to transmit the first uplink signal, when the first uplink signal carries data and the first PUCCH and the second PUCCH carry HARQ-ACK; determine to transmit information carried by the first PUCCH and information carried by the first uplink signal on the first uplink signal and determine not to transmit the second PUCCH, or determine to transmit information carried by the first PUCCH and information carried by the first uplink signal on the first PUCCH and transmit the second PUCCH on a different time-domain resource, when the first uplink signal carries CSI and the first PUCCH and the second PUCCH carry CSI; determine to transmit to the network device the first PUCCH and the second PUCCH on different time-domain resources and determine not to transmit the first uplink signal, when the first uplink signal carries CSI and the first PUCCH and the second PUCCH carry HARQ; determine to transmit information carried by the first PUCCH and information carried by the first uplink signal on the first PUCCH and determine to transmit the second PUCCH on a different time-domain resource, when the first uplink signal carries an SR and the first PUCCH and the second PUCCH carry CSI; or determine to transmit information carried by the first PUCCH and information carried by the first uplink signal on the first PUCCH and determine to transmit the second PUCCH on a different time-domain resource, when the first uplink signal carries an SR and the first PUCCH and the second PUCCH carry HARQ.

In a possible example, when the first uplink signal is a third PUCCH, multiplexing and transmission of the first uplink signal and the first PUCCH refers to: information carried by the first PUCCH and information carried by the third PUCCH are multiplexed, and the multiplexed information is transmitted on the first PUCCH or the third PUCCH.

In a possible example, when the first uplink signal is a PUSCH, multiplexing and transmission of the first uplink signal and the first PUCCH refers to: information carried by the first PUCCH and data in the PUSCH are multiplexed and the multiplexed data is transmitted on the PUSCH.

In a possible example, multiplexing and transmission of the first uplink signal and the first PUCCH specifically refers to: information in the first uplink signal and information in the first PUCCH are multiplexed and transmitted on the first PUCCH, and the second PUCCH is transmitted on a different time-domain resource.

In a possible example, transmission of the first PUCCH and the second PUCCH on different time-domain resources specifically refers to: the first PUCCH and the second PUCCH are transmitted on different time-domain resources without transmitting the first uplink signal.

In a possible example, the first information includes the ACK/NACK feedback mode configured by the network. In terms of determining the transmission mode of at least one of the first uplink signal, the first PUCCH, and the second PUCCH according to the first information, the processing unit is specifically configured to operate as follows. The processing unit is configured to determine to multiplex information carried by the first PUCCH, information carried by the second PUCCH, and information carried by the first uplink signal and transmit on a same PUCCH or PUSCH, when the ACK/NACK feedback mode is joint feedback. And/or, when the ACK/NACK feedback mode is separate feedback, the processing unit configured to determine the transmission mode of at least one of the first uplink signal, the first PUCCH, and the second PUCCH is configured to perform at least one of: determine not to transmit the first uplink signal, the first PUCCH, and the second PUCCH; determine to multiplex information carried by the first uplink signal and information carried by the first PUCCH and transmit on the first uplink signal, and determine not to transmit the second PUCCH; determine to transmit the first PUCCH and the second PUCCH, and determine not to transmit the first uplink signal; or multiplex information carried by the first uplink signal and information carried by the first PUCCH and determine to transmit on the first PUCCH, and determine to transmit the second PUCCH on a different time-domain resource.

In a possible example, in terms of determining the transmission mode of at least one of the first uplink signal, the first PUCCH, and the second PUCCH when the first PUCCH and the second PUCCH both overlap with the time-domain resource of the first uplink signal, the processing unit is specifically configured to: determine the transmission mode of at least one of the first uplink signal, the first PUCCH, and the second PUCCH according to a preset rule.

In a possible example, the preset rule includes at least one of: the first uplink signal and one of the first PUCCH and the second PUCCH which has an associated CORESET pool index of a preset value are multiplexed and transmitted, the first uplink signal and one of the first PUCCH and the second PUCCH which is earlier are multiplexed and transmitted; the first uplink signal and one of the first PUCCH and the second PUCCH which has an earlier triggering DCI are multiplexed and transmitted; the first uplink signal and one of the first PUCCH and the second PUCCH which has an earlier transmission time of a corresponding PDSCH are multiplexed and transmitted; or the first uplink signal and one of the first PUCCH and the second PUCCH which has a triggering DCI adopting an agreed DCI format are multiplexed and transmitted.

In a possible example, in terms of determining the transmission mode of at least one of the first uplink signal, the first PUCCH, and the second PUCCH when the first PUCCH and the second PUCCH both overlap with the time-domain resource of the first uplink signal, the processing unit is specifically configured to: determine not to transmit the first PUCCH, the second PUCCH, and the first uplink signal.

In a possible example, the first uplink signal includes any one of: a PUSCH, a PUCCH carrying CSI, or a PUCCH carrying an SR.

In a possible example, when the first PUCCH carries first HARQ-ACK, a CORESET pool index associated with the first PUCCH is a CORESET pool index of a CORESET carrying a PDCCH for scheduling a PDSCH corresponding to the first HARQ-ACK. When the second PUCCH carries second HARQ-ACK, a CORESET pool index associated with the second PUCCH is a CORESET pool index of a CORESET carrying a PDCCH for scheduling a PDSCH corresponding to the second HARQ-ACK.

In a possible example, when the first PUCCH carries CSI, a CORESET pool index associated with the first PUCCH is a CORESET pool index associated with a PUCCH resource of the first PUCCH and configured by higher-layer signaling, or the CORESET pool index associated with the first PUCCH is a CORESET pool index associated with a CSI reporting configuration corresponding to the CSI.

In a possible example, when the first PUCCH carries an SR, a CORESET pool index associated with the first PUCCH is a CORESET pool index associated with a PUCCH resource of the first PUCCH and configured by higher-layer signaling, or the CORESET pool index associated with the first PUCCH is 0.

In a possible example, the first PUCCH does not overlap with the second PUCCH in time domain.

In a possible example, the first PUCCH does not overlap with the second PUCCH in time domain refers to: the first PUCCH and the second PUCCH occupy different OFDM symbols in one slot.

In a possible example, the processing unit is further configured to perform the following after determining the transmission mode of at least one of the first uplink signal, the first PUCCH, and the second PUCCH when the first PUCCH and the second PUCCH both overlap with the time-domain resource of the first uplink signal: the processing unit is configured to transmit at least one signal among the first PUCCH, the second PUCCH, and the first uplink signal according to the transmission mode via the communicating unit.

In a possible example, the processing unit is further configured to receive indication information of an ACK/NACK feedback mode configured by a network, where the ACK/NACK feedback mode indicated by the indication information is separate feedback.

Figure 7:
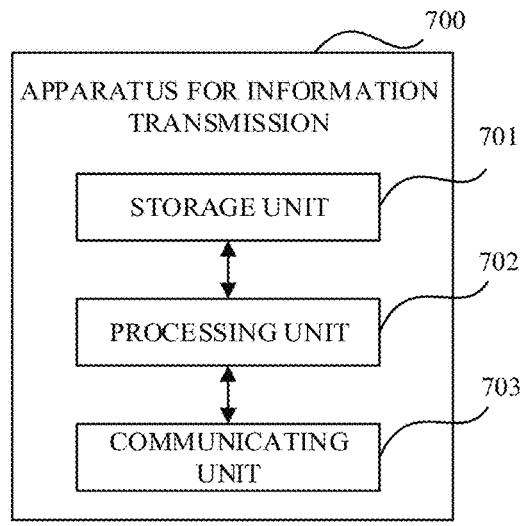
FIG. 7 is a block diagram of functional units of an apparatus for information transmission provided in implementations of the disclosure.

If the integrated unit is adopted, FIG. 7 illustrates a possible block diagram of functional units of an apparatus for information transmission provided in the foregoing implementations of the disclosure. The apparatus 700 for information transmission is applicable to a network device. The network device includes a processing unit 702 and a communicating unit 703. The processing unit 702 is configured to control and manage operations of the network device. For example, the processing unit 702 is configured to support the network device to perform 5301 illustrated in FIG. 3 and/or other processes described in the technical solutions of the disclosure. The communicating unit 703 is configured to support the network device to communicate with other devices. The network device may further include a storage unit 701. The storage unit 701 is configured to store program codes and data of the network device.

The processing unit 702 may be a processor or a controller and may be, for example, a CPU, a general-purpose processor, a DSP, an ASIC, an FPGA, or other programmable logic devices, transistor logic devices, hardware components, or a combination thereof. Various exemplary logic blocks, modules, and circuits disclosed in implementations of the disclosure can be implemented or executed. The processor may also be a combination for implementing computing functions, for example, one or more microprocessors, a combination of DSP and microprocessor, or the like. The communicating unit 703 may be a communication interface, a transceiver, a transceiver circuit, etc. The storage unit 701 may be a memory. When the processing unit 702 is a processor, the communicating unit 703 is a communication interface, and the storage unit 701 is a memory, the network device in this embodiment of the disclosure may be the network device illustrated in FIG. 5.

The processing unit 702 is configured to operate as follows. The processing unit is configured to transmit first configuration information, second configuration information, and third configuration information to a terminal via the communicating unit, where the first configuration information is used for configuring a first PUCCH, the second configuration information is used for configuring a second PUCCH, the third configuration information is used for configuring a first uplink signal, and the first PUCCH and the second PUCCH are associated with different CORESET pool indexes. The processing unit is configured to determine that the first PUCCH and the second PUCCH do not overlap simultaneously with the first uplink signal in time domain.

In a possible example, when the first PUCCH carries first HARQ-ACK, a CORESET pool index associated with the first PUCCH is a CORESET pool index of a CORESET carrying a PDCCH for scheduling a PDSCH corresponding to the first HARQ-ACK. When the second PUCCH carries second HARQ-ACK, a CORESET pool index associated with the second PUCCH is a CORESET pool index of a CORESET carrying a PDCCH for scheduling a PDSCH corresponding to the second HARQ-ACK.

In a possible example, when the first PUCCH carries CSI, a CORESET pool index associated with the first PUCCH is any one of: a CORESET pool index associated with a PUCCH resource of the first PUCCH and configured by higher-layer signaling, or a CORESET pool index associated with a CSI reporting configuration corresponding to the CSI.

In a possible example, when the first PUCCH carries an SR, a CORESET pool index associated with the first PUCCH is any one of: a CORESET pool index associated with a PUCCH resource of the first PUCCH and configured by higher-layer signaling, or the CORESET pool index associated with the first PUCCH is 0.

In a possible example, the first PUCCH does not overlap with the second PUCCH in time domain.

In a possible example, the first PUCCH does not overlap with the second PUCCH in time domain refers to: the first PUCCH and the second PUCCH occupy different OFDM symbols in one slot.

In a possible example, the first uplink signal includes any one of: a PUSCH, a PUCCH carrying CSI, or a PUCCH carrying an SR.

In a possible example, the processing unit is further configured to: transmit fourth configuration information to the terminal via the communicating unit, where the fourth configuration information is used for configuring an ACK/NACK feedback mode to be separate feedback.

In a possible example, the processing unit is further configured to perform the following after determining that the first PUCCH and the second PUCCH do not overlap simultaneously with the first uplink signal in time domain: the processing unit is configured to receive at least one signal among the first PUCCH, the second PUCCH, and the first uplink signal from the terminal via the communicating unit.

It can be understood that, the method implementations and the apparatus implementations are different presentation forms of the same technical concept, and thus in the disclosure, contents of the method implementations should be adapted to the apparatus implementations, which will not be repeated herein.

Implementations of the disclosure further provide a chip. The chip includes a processor. The processor is configured to invoke and execute computer programs stored in a memory, to cause a device equipped with the chip to perform some or all operations of the terminal described in the foregoing method implementations.

Implementations of the disclosure further provide a computer readable storage medium. The computer readable storage medium is configured to store computer programs for electronic data interchange (EDI) which are operable with a computer to perform some or all operations of the terminal described in the foregoing method implementations.

Implementations of the disclosure further provide a computer readable storage medium. The computer readable storage medium is configured to store computer programs for EDI which are operable with a computer to perform some or all operations of a network-side device described in the foregoing method implementations.

Implementations of the disclosure further provide a computer program product. The computer program product includes computer programs which are operable with a computer to perform some or all operations of the terminal described in the foregoing method implementations. The computer program product may be a software installation package.

The steps of the method or algorithm described in implementations of the disclosure may be implemented by means of hardware, or may be implemented by executing software instructions by a processor. The software instructions can be composed of corresponding software modules, which can be stored in a random access memory (RAM), a flash memory, a read only memory (ROM), an erasable programmable ROM (EPROM), an electrically EPROM, EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in an access network device, a target network device, or a core network device. The processor and the storage medium may also be present as discrete components in the access network device, the target network device, or the core network device.

Those skilled in the art will appreciate that, all or part of functions described in one or more of the foregoing implementations can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for information transmission, being applicable to a terminal device and comprising:
    receiving indication information of an acknowledge/non-acknowledge (ACK/NACK) feedback mode configured by a network; and
    determining not to transmit a first uplink signal, a first physical uplink control channel (PUCCH), and a second PUCCH when the ACK/NACK feedback mode indicated by the indication information is separate feedback and the first PUCCH and the second PUCCH both overlap with a time-domain resource of the first uplink signal, the first PUCCH and the second PUCCH being associated with different control resource set (CORESET) pool indexes, wherein the first uplink signal is a physical uplink shared channel (PUSCH).

2. The method of claim 1, wherein determining not to transmit the first uplink signal, the first PUCCH, and the second PUCCH comprises:
    taking, by the terminal device, a situation where the ACK/NACK feedback mode indicated by the indication information is the separate feedback and the first PUCCH and the second PUCCH both overlap with the time-domain resource of the first uplink signal as an error case.

3. The method of claim 1, wherein:
    when the first PUCCH carries first HARQ-ACK, a CORESET pool index associated with the first PUCCH is a CORESET pool index of a CORESET carrying a physical downlink control channel (PDCCH) for scheduling a PDSCH corresponding to the first HARQ-ACK;
    when the second PUCCH carries second HARQ-ACK, a CORESET pool index associated with the second PUCCH is a CORESET pool index of a CORESET carrying a PDCCH for scheduling a PDSCH corresponding to the second HARQ-ACK.

4. The method of claim 1, wherein the first PUCCH does not overlap with the second PUCCH in time domain.

5. The method of claim 4, wherein the first PUCCH does not overlap with the second PUCCH in time domain refers to:
    the first PUCCH and the second PUCCH occupy different orthogonal frequency division multiplexing (OFDM) symbols in one slot.

6. A method for information transmission, being applicable to a network device and comprising:
    transmitting indication information of an acknowledge/non-acknowledge (ACK/NACK) feedback mode to a terminal, the indication information indicating whether the ACK/NACK feedback mode is separate feedback;
    configuring a first physical uplink control channel (PUCCH) and a second PUCCH such that at most one of the first PUCCH and the second PUCCH overlap with a first uplink signal in time domain, wherein the first uplink signal is a physical uplink shared channel (PUSCH); and
    transmitting first configuration information, second configuration information, and third configuration information to the terminal, the first configuration information being used for configuring the first PUCCH, the second configuration information being used for configuring the second PUCCH, the third configuration information being used for configuring the first uplink signal, the first PUCCH and the second PUCCH being associated with different control resource set (CORESET) pool indexes.

7. The method of claim 6, wherein:
    when the first PUCCH carries first hybrid automatic repeat request (HARQ)-ACK, a CORESET pool index associated with the first PUCCH is a CORESET pool index of a CORESET carrying a physical downlink control channel (PDCCH) for scheduling a physical downlink shared channel (PDSCH) corresponding to the first HARQ-ACK;
    when the second PUCCH carries second HARQ-ACK, a CORESET pool index associated with the second PUCCH is a CORESET pool index of a CORESET carrying a PDCCH for scheduling a PDSCH corresponding to the second HARQ-ACK.

8. The method of claim 6, wherein when the first PUCCH carries channel state information (CSI), a CORESET pool index associated with the first PUCCH is any one of: a CORESET pool index associated with a PUCCH resource of the first PUCCH and configured by higher-layer signaling, or a CORESET pool index associated with a CSI reporting configuration corresponding to the CSI.

9. The method of claim 6, wherein when the first PUCCH carries a scheduling request (SR), a CORESET pool index associated with the first PUCCH is any one of: a CORESET pool index associated with a PUCCH resource of the first PUCCH and configured by higher-layer signaling, or the CORESET pool index associated with the first PUCCH is 0.

10. A terminal device, comprising:
    a transceiver;
    a memory storing instructions; and
    a processor configured to execute the instructions to:
        make the transceiver receive indication information of an acknowledge/non-acknowledge (ACK/NACK) feedback mode configured by a network; and
        determine not to transmit a first uplink signal, a first physical uplink control channel (PUCCH), and a second PUCCH when the ACK/NACK feedback mode indicated by the indication information is separate feedback and the first PUCCH and the second PUCCH both overlap with a time-domain resource of the first uplink signal, the first PUCCH and the second PUCCH being associated with different control resource set (CORESET) pool indexes, wherein the first uplink signal is a physical uplink shared channel (PUSCH).

11. The terminal device of claim 10, wherein the processor is configured execute the instructions to take a situation where the ACK/NACK feedback mode indicated by the indication information is the separate feedback and the first PUCCH and the second PUCCH both overlap with the time-domain resource of the first uplink signal as an error case.

12. The terminal device of claim 10, wherein:
when the first PUCCH carries first HARQ-ACK, a CORESET pool index associated with the first PUCCH is a CORESET pool index of a CORESET carrying a physical downlink control channel (PDCCH) for scheduling a PDSCH corresponding to the first HARQ-ACK;
when the second PUCCH carries second HARQ-ACK, a CORESET pool index associated with the second PUCCH is a CORESET pool index of a CORESET carrying a PDCCH for scheduling a PDSCH corresponding to the second HARQ-ACK.

13. The terminal device of claim 10, wherein the first PUCCH does not overlap with the second PUCCH in time domain.

14. The terminal device of claim 13, wherein the first PUCCH does not overlap with the second PUCCH in time domain refers to:
the first PUCCH and the second PUCCH occupy different orthogonal frequency division multiplexing (OFDM) symbols in one slot.

* * * * *